(12) United States Patent
Höhn

(10) Patent No.: US 11,892,063 B2
(45) Date of Patent: Feb. 6, 2024

(54) TWO-SPEED TRANSMISSION FOR AN ELECTRIC DRIVE SYSTEM, AND DRIVE SYSTEM INCLUDING SUCH A TWO-SPEED TRANSMISSION

(71) Applicant: HÖHN GMBH, Gräfelfing (DE)

(72) Inventor: Bernd-Robert Höhn, Munich (DE)

(73) Assignee: HÖHN GMBH, Gräfelfing (DE)

( * ) Notice: Subject to any disclaimer, the term of this patent is extended or adjusted under 35 U.S.C. 154(b) by 34 days.

(21) Appl. No.: 17/768,592

(22) PCT Filed: Oct. 16, 2020

(86) PCT No.: PCT/EP2020/079280
§ 371 (c)(1),
(2) Date: Apr. 13, 2022

(87) PCT Pub. No.: WO2021/074428
PCT Pub. Date: Apr. 22, 2021

(65) Prior Publication Data
US 2023/0296162 A1 Sep. 21, 2023

(30) Foreign Application Priority Data
Oct. 18, 2019 (DE) ..................... 10 2019 128 160.1

(51) Int. Cl.
*F16H 61/04* (2006.01)
*F16H 3/78* (2006.01)
(Continued)

(52) U.S. Cl.
CPC ............. *F16H 3/78* (2013.01); *F16D 23/025* (2013.01); *F16D 23/04* (2013.01);
(Continued)

(58) Field of Classification Search
CPC ...... F16H 3/78; F16H 61/0403; F16H 63/304; F16H 2057/02034; F16H 2057/02043;
(Continued)

(56) References Cited

U.S. PATENT DOCUMENTS 2,397,943 A * 4/1946 Bull .................. F16D 23/06
192/53.35
4,132,298 A 1/1979 F'Geppert
(Continued)

FOREIGN PATENT DOCUMENTS

CH 713240 A2 6/2018
CN 108644371 A * 10/2018
(Continued)

OTHER PUBLICATIONS

English translation of the Written Opinion of the International Searching Authority in parent application No. PCT/EP2020/079280.
(Continued)

*Primary Examiner* — Justin Holmes
(74) *Attorney, Agent, or Firm* — J-TEK LAW PLLC; Jeffrey D. Tekanic; Scott T. Wakeman

(57) ABSTRACT

A compact and fast-shifting two-speed transmission for an electric drive system, such as an electric vehicle, has two synchronized dog clutches. A sliding sleeve for engaging a first and second gear is actuatable using a single actuator. A substantially load-interruption-free shifting is realized via a friction engagement in the synchronization. A drive system having such a two-speed transmission is capable of achieving at least substantially load-interruption-free shifting.

20 Claims, 9 Drawing Sheets

(51) Int. Cl.
*F16D 23/02* (2006.01)
*F16D 23/04* (2006.01)
*F16H 63/30* (2006.01)
*F16H 57/02* (2012.01)

(52) U.S. Cl.
CPC ....... *F16H 61/0403* (2013.01); *F16H 63/304* (2013.01); *F16H 2057/02034* (2013.01); *F16H 2057/02043* (2013.01); *F16H 2061/0418* (2013.01); *F16H 2063/3066* (2013.01); *F16H 2200/0021* (2013.01); *F16H 2200/0034* (2013.01); *F16H 2200/2007* (2013.01); *F16H 2200/2041* (2013.01); *F16H 2200/2064* (2013.01); *F16H 2200/2094* (2013.01)

(58) Field of Classification Search
CPC ..... F16H 2061/0418; F16H 2063/3066; F16H 2200/0021; F16H 2200/0034; F16H 2200/2007; F16H 2200/2041; F16H 2200/2064; F16H 2200/2094; F16D 23/025; F16D 23/04
See application file for complete search history.

(56) References Cited

U.S. PATENT DOCUMENTS

| | | | |
|---|---|---|---|
| 4,573,371 A | 3/1986 | Akutagawa | |
| 2007/0199786 A1* | 8/2007 | Hiraiwa | F16D 23/06 192/53.34 |
| 2010/0219034 A1 | 9/2010 | Wheals et al. | |
| 2010/0267508 A1 | 10/2010 | Hvolka et al. | |
| 2015/0330492 A1 | 11/2015 | Lee et al. | |
| 2017/0067539 A1 | 3/2017 | Matsumoto et al. | |
| 2019/0032754 A1 | 1/2019 | Hall et al. | |
| 2019/0063561 A1 | 2/2019 | Scheerer | |

FOREIGN PATENT DOCUMENTS

| | | | |
|---|---|---|---|
| DE | 102013225519 A1 * | 6/2015 | ............... B60K 1/00 |
| DE | 102013225519 A1 | 6/2015 | |
| DE | 102015106503 A1 | 11/2015 | |
| DE | 102016201225 A1 | 1/2017 | |
| EP | 2388497 A1 | 11/2011 | |
| JP | S5386964 A | 7/1978 | |
| JP | 2009510353 A | 3/2009 | |
| WO | 2012082380 A1 | 6/2012 | |
| WO | 2014120064 A1 | 8/2014 | |
| WO | 2017186473 A1 | 11/2017 | |

OTHER PUBLICATIONS

English translation the International Search Report dated Apr. 22, 2021 for parent application No. PCT/EP2020/079280.

Office Action dated Jun. 27, 2023, in related JP application No. 2022-522810, and machine translation thereof.

Office Action from the German Patent Office dated May 4, 2020 in related German application No. 10 2019 128 160.1, and machine translation thereof.

Search Report from the Japanese Patent Office dated Jun. 16, 2023 in related Japanese application No. 2022-522810, and machine translation thereof.

Human translation of Office Action dated Jun. 27, 2023, in related JP application No. 2022-522810.

* cited by examiner

TWO-SPEED TRANSMISSION FOR AN ELECTRIC DRIVE SYSTEM, AND DRIVE SYSTEM INCLUDING SUCH A TWO-SPEED TRANSMISSION

CROSS-REFERENCE

This application is the U.S. national stage of International Application No. PCT/EP2020/079280 filed on Oct. 16, 2020, which claims priority to German patent application no. 10 2019 128 160.1 filed on Oct. 18, 2019.

TECHNICAL FIELD

The present disclosure relates to a two-speed transmission for an electric drive system, and to an electric drive system having such a two-speed transmission.

RELATED ART

A characteristic of electric motors, such as are usually used in drive systems for electrically powered motor vehicles, is that the electric drive machines output a high, approximately constant torque from standstill up to a specific nominal rotational speed. Then, the torque drops significantly with increasing rotational speed at rotational speeds exceeding the nominal rotational speed. The power of the electric motor increases in a manner corresponding to increasing rotational speed, and usually reaches its highest point in the range of the nominal rotational speed. Even at a rotational speed exceeding the nominal rotational speed up to the maximum rotational speed, this maximum power in the range of the nominal rotational speed is largely maintained or decreases only slightly until reaching the maximum rotational speed. Electric motors used in electric drive systems for vehicles are usually designed such that, at the prescribed maximum speed of the vehicle, the electric motor is operated in the range of its maximum rotational speed, and also delivers approximately the maximum power there. The gear ratio, which is required for this purpose, between the rotational speed of the electric motor and wheels driven by it can lead to a start-up with sufficient acceleration or sufficient torque, in particular at, for example, a gradient, that is not possible. In addition, a change of the gear ratio can also be advantageous during normal driving operation if the electric motor will thereby run with better efficiency.

A drive system for an electric vehicle, which includes a planetary transmission having an input shaft forming a sun gear, a planet carrier, which carries a first set of planetary gears and a second set of planetary gears that are fixedly connected to one another, a first ring gear that is associated with the first set of planetary gears, and a second ring gear that is associated with the second set of planetary gears, is known from DE 10 2013 225 519 A1. Each one of the ring gears is locked by one locking means, whereby two different gear ratios are set. A special feature of this disclosure is that a two-speed transmission is proposed in which a parking lock is realized, without additional components, by locking both ring gears concurrently. For this purpose it is necessary that the two locking means for the two ring gears are actuatable independently of each other. Two independent actuators are thus required for the locking means.

SUMMARY

One non-limiting object underlying the present invention is to provide a two-speed transmission for an electric drive system for a vehicle, which makes possible, in a compact and simple construction, two rapidly shiftable gear ratio stages between an electric motor and the driven vehicle wheels, wherein the shifting from the first gear into a second gear can be effected with only a slight load interruption or no load interruption. Furthermore, it is another non-limiting object to provide a corresponding electric drive system, using which it can be quickly shifted from the first gear into the second gear with only a slight load interruption or no load interruption.

In one representative, non-limiting aspect of the present teachings, a transmission for an electric drive system of a vehicle preferably utilizes a displacing device having only a single actuator for displacing a sliding sleeve between a first position, where the transmission is configured to convert input torque into output torque at a first gear ratio, and a second position, where the transmission is configured to convert input torque into output torque at a second gear ratio.

By providing only a single actuator, using which the sliding sleeve is movable in two directions, the control complexity, the susceptibility to errors, the installation space, and ultimately the costs decrease. Alternatively a plurality of actuators can be provided.

In other aspects of the transmission disclosed herein, preferably only one of two ring gears is respectively lockable to a housing using a locking device; i.e., preferably both ring gears are not simultaneously lockable using the locking device. The locking is preferably effected via a synchronized tooth engagement. The locking device preferably includes synchronous clutches (synchronized dog clutches). The friction regions for the synchronization are preferably dimensioned large enough that their torque capacity is high enough to maintain a substantially constant torque, preferably without interruption or with only a slight interruption/reduction, at the output, even during the shifting-phase or synchronization-phase (e.g., the decrease of the input rotational speed during the shifting from 1→2). Therefore synchronous clutches from truck transmissions, which are directly connected to the two ring gears, are preferably used. The friction regions of the synchronizations preferably have a larger diameter than the diameter of the smaller of the two ring gears.

In addition, the transmission can be configured in a very compact manner, and depending on the available installation space or other requirements, can be disposed, for example, parallel to a drive axle of the vehicle, alongside a drive shaft, or in the vehicle longitudinal direction.

The gear geometries, which are suitable for use in the locking device, preferably correspond to those of conventionally configured synchronous clutches (with/without chamfered teeth). Thus, for example, the internal gearing (internal gear) of the sliding sleeve and the external gearing (external gear) of the synchronizer rings, and optionally also the synchronizer body, are spur-toothed and provided with generally known chamfered teeth. "Chamfered teeth" means here, in particular, that the ends of the teeth preferably each converge in the axial direction to a point or converge in the shape of a triangle so that, in the first phase of the engagement of the external gearing and the internal gearing, two oblique surfaces can lie against each other. An axial force can be transmitted via these oblique surfaces with simultaneous torque transmission. This relative rotation position of the synchronizer ring with respect to the sliding sleeve is also referred to as the lock position. Only when the torque on the cone is sufficiently low, the oblique surfaces slip off from each other while the axial force is further maintained.

This leads to an aligning of the teeth, which teeth finally fully engage into the chamfered teeth of the synchronizer body (full engagement position) in the second phase of the engagement. This relative rotation position of the synchronizer ring with respect to the sliding sleeve is also referred to as the released position.

In the neutral position of the sliding sleeve, preferably none of the ring gears are locked with respect to the housing, since on the one hand none of the synchronizer bodies are in engagement with the sliding sleeve, and on the other hand the synchronizer ring that is in engagement with the sliding sleeve is held substantially free of axial force, so that substantially no torque (no braking) is effected via the friction regions. Thus a neutral gear is preferably thereby realized, i.e., in this position preferably no torque can be transmitted from the input shaft to the output shaft. For the realization of such a neutral position, the width of the internal gearing of the sliding sleeve must preferably be configured such that it is smaller than the spacing between the external gearing of a freely rotating synchronizer ring (synchronizer ring that is not in engagement with the sliding sleeve, and that is preferably supported in a manner free of axial force) and the external gearing of the synchronizer body opposite this (i.e., the other) synchronizer ring. The width of the internal gearing is preferably between 0.01 mm and 0.2 mm smaller, depending on the tolerances, than this spacing so that, on the one hand, an engagement with the synchronizer body, which is associated with the synchronizer ring that is situated in the engagement, is realizable from a standing position by only a very short movement of the sliding sleeve. In particular, for the full engagement, the sliding sleeve preferably need only travel a distance that corresponds to the tooth width of the synchronizer body plus the (preferably very small) spacing that the internal gearing of the sliding sleeve has with respect to the external gearing of the synchronizer body in the neutral position. At the same time, during shifting from the one gear into the other gear during driving, a neutral position is formed only in a very small region, which allows a nearly load-interruption-free shifting.

By designing the transmission according to the present disclosure, the following additional positions of the sliding sleeve can preferably be set for the shifting from the first gear into the other (second) gear, and vice versa, during driving of the vehicle.

For shifting from the first gear into the second gear (in particular during driving), the sliding sleeve must be moved from an engagement position with the first synchronizer body beyond the neutral position (in which an engagement with the first synchronizer body is released) toward the other synchronizer body, and ultimately brought into engagement with the second synchronizer body via a synchronization by which a braking or locking of the second synchronizer body is achieved. A shifting from the second gear into the first gear is effected in an analogous manner.

In the neutral position, preferably only the first synchronization ring is still in engagement with the sliding sleeve; i.e., preferably the first synchronizer body is no longer in engagement and is also no longer braked by the first synchronizer ring (owing to a lack of axial force). In this position of the sliding sleeve, the first synchronizer body can thus begin to rotate freely, which also causes that no more torque can be transmitted via the first planetary transmission at least starting from reaching a final rotational speed. In the neutral position, preferably no synchronizer body is in engagement, so that a load interruption can actually occur if the sliding sleeve remains in the neutral position beyond a predetermined time duration. If the dwell time is short, substantially no load interruption takes place, in particular since, due to its inertia, the now-released first synchronizer body having the corresponding ring gear still supports a torque in the acceleration up to the final rotational speed. In order that this time is as short as possible, the internal gearing of the sliding sleeve has a minimum width that is preferably wider by the thickness of the synchronizer ring than the axial spacing of the external gearing of the synchronizer rings.

For shifting from the neutral position into the second gear, the second synchronizer body must be brought to a standstill, and the internal gearing of the sliding sleeve and the external gearing of the synchronizer body must come into engagement. For this purpose, an axial force is preferably applied by the sliding sleeve to the stationary synchronizer ring, and the synchronizer ring is pushed via the conical friction engagement onto the second synchronizer body, whereby it is braked to the standstill, i.e., synchronized. During the standstill, the sliding sleeve can then be brought into engagement with the synchronizer body (engagement position). The position of the sliding sleeve, in which the synchronization, i.e., the braking, is effected, is referred to as the synchronization position.

The applying of the axial force onto the second synchronizer ring in this synchronization position is preferably effected by an abutment of the oblique surfaces (chamfered surfaces) of the chamfered teeth of the sliding sleeve against the oblique surfaces (chamfered surfaces) of the chamfered teeth of the synchronizer ring. The tooth-heads and tooth-troughs of the sliding sleeve and those of the synchronizer ring are thus rotated by an angle relative to each other. In this relative rotational position, the synchronizer ring is located in a lock position with respect to the sliding sleeve. When the teeth are aligned (without relative rotation with respect to one another), the applying or transmitting of a substantial axial force is not possible. Instead, the sliding sleeve is then pushed over the synchronizer ring without transmission of a significant axial force, and is thereby brought into full engagement therewith. This relative rotation position of the synchronizer ring with respect to the sliding sleeve is referred to as the released position.

In order to set this lock position (relative rotation) between the synchronizer ring and the sliding sleeve, in addition to the external circumferential gearing, the synchronizer ring has, preferably on its side facing the respective other synchronizer ring, at least one radially outwardly protruding pre-synchronization projection, which is guided in the axial direction, independent of the position of the sliding sleeve, in a pre-synchronization groove provided on the inner circumferential side of the sliding sleeve. Here, the pre-synchronization projection and the pre-synchronization groove are configured such that a relative rotation between the lock position and the released position is possible, and a limit stop is realized at least in the lock position. A further rotation of the synchronizer ring with respect to the sliding sleeve is prevented.

Furthermore, preferably a locking strut, which is held between the synchronizer rings, is provided, which locking strut is pressable by the sliding sleeve, in a pre-synchronization position, against the second synchronizer ring. For this purpose, on the inner circumference side, the sliding sleeve preferably has a chamfered shoulder (oblique abutment surface); a corresponding outer-circumference-side shoulder (oblique abutment surface) of the locking strut can be brought into abutment therewith. With the conical friction engagement, which is caused by the axial force, of the synchronizer ring with the rotating second synchronizer body, a brake torque acts on the synchronizer body (without bringing the synchronizer body to the standstill), which torque rotates the synchronizer ring relative to the sliding sleeve into the lock position. The locking strut is thereby held between the synchronizer rings, for example, by a spring such that, in the further movement of the sliding sleeve from the pre-synchronization position into the synchronization position, the chamfered shoulders preferably come out of engagement again, and preferably no significant axial force is exertable any longer via the locking strut onto the synchronizer ring.

In the synchronization position, the sliding sleeve is preferably in engagement with both synchronizer rings, of which one is preferably free of axial force since it is not in the locking position, but rather is in full tooth engagement or the gearings are aligned with respect to each other.

After the braking of the synchronizer body to the standstill, the sliding sleeve can be moved further toward the second synchronizer body while the external gearing of the synchronizer ring (reverse relative rotation over the oblique surfaces of the chamfered teeth) is aligned with the inner ring of the sliding sleeve. In the further movement of the sliding sleeve, it then also comes into engagement with the external gearing of the second synchronizer body (optionally with further aligning by the chamfered teeth of the sliding sleeve and of the synchronizer body), so that the second gear is completely engaged.

The shifting back from the second gear into the first gear is effected in an analogous manner. Here a neutral position first occurs in a corresponding manner, in which only the second synchronizer ring is in engagement; then with the movement of the sliding sleeve, the displacement of the locking strut for pre-synchronization with the first synchronizer ring occurs, and subsequently the synchronization of the synchronizer body occurs.

The synchronization is preferably effected by conical friction regions/friction surfaces on the synchronizer body as well as on the synchronizer ring. Alternatively or additionally, additional friction linings can be provided on the axial end surfaces. In addition to a single-cone synchronization, a multi-cone synchronization can also be provided, in which a plurality of conical intermediate rings is provided between the synchronizer body and the synchronizer ring.

One or more locking struts can be provided. One or preferably a plurality of, preferably three, pre-synchronization-projections and pre-synchronization-grooves can be provided.

Instead of a sliding sleeve supported in the housing to be non-rotatable relative to the housing while being axially displaceable, in general a sliding sleeve can also be provided which, as with conventional synchronizer subassemblies, is supported on an output shaft or an input shaft to be non-rotatable relative to the housing while being axially displaceable. Using the sliding sleeve, either a first gear freely rotatably supported on the shaft, or a second gear freely rotatably supported on the shaft, can be connected to the sliding sleeve to be non-rotatable relative to the sliding sleeve by bringing the first gear or second gear into engagement with the sliding sleeve.

The external gearings of the synchronizer bodies preferably have the same diameter. However, different diameters can alternatively be used, wherein the sliding sleeve is then correspondingly configured in a stepped manner.

The specified requirements for the width of the internal gearing of the sliding sleeve preferably apply in particular to the newly manufactured transmission. Furthermore, it is preferred that the transmission is designed such that they also apply to the transmission at the wear limit (when the friction cone of the synchronizer ring is worn, the distance between the synchronizer ring and the synchronizer body is less than in the initial position portrayed here), in which the synchronizer rings lie farther outward in the synchronization position.

The feature that the locking device is configured such that the sliding sleeve is bringable by axial movement into a neutral position, in which the internal gearing of the sliding sleeve is not in engagement with the external gearing of the synchronizer body and at the same time is in engagement with the external gearing of only one of the synchronizer rings, preferably applies to both synchronizer rings equally (i.e., to one neutral position with the one synchronizer ring as well as to another neutral position with the respective other synchronizer ring).

Also with respect to the feature that the sliding sleeve has a width that is greater than the spacing of the external gearing of the synchronizer rings, preferably measured in the neutral position, it applies preferably to the neutral position in engagement with the one synchronizer ring as well as to the neutral position in engagement with the other synchronizer ring. Alternatively, as above, the feature can apply only to one of the synchronizer rings.

The first gear ratio is preferably greater than the second gear ratio.

An electric drive system is also described, in which it preferably can be shifted from a first gear into a second gear in a substantially load-interruption-free manner, i.e., with no or only a slight load interruption. The drive system is preferably configured such that this substantially load-interruption-free shifting process is realized in particular at maximum power demand by the driver.

An electric drive machine (electric motor) has initially approximately increasing power with increasing motor rotational speed, which power remains substantially constant (constant power range) starting from a nominal rotational speed up to a maximum rotational speed. Accordingly the respective maximum output torque is at first constant with respect to the rotational speed, and then drops, starting from the nominal rotational speed, with further increasing rotational speed up to the maximum rotational speed (in the shape of a hyperbola). At the maximum rotational speed, the electric drive machine therefore has a maximum rotational speed torque, which is the maximum output torque at the maximum rotational speed.

At the maximum rotational speed of the electric drive machine, a first maximum output rotational speed is realized using the first gear ratio (at which it can be driven in the first gear), which first gear ratio is realized by the first planetary transmission. In order to further increase this output rotational speed, it can be shifted into the second gear, using which a second maximum output rotational speed can be achieved at the maximum rotational speed (provided it can be still achieved in view of the available power).

The drive system is further preferably configured such that, during shifting from the first gear at maximum rotational speed into the second gear at a substantially constant or only slightly increasing output rotational speed, the gear ratio of the second gear leads to a rotational speed of the electric drive machine, which falls in the range of the constant power output of the electric drive machine. This rotational speed is preferably greater than the nominal rotational speed. The gear ratio of the second gear is preferably chosen such that, at a constant output rotational speed, the rotational speed of the electric drive machine after the engaging of the second gear is greater than the nominal rotational speed plus a quarter of the difference of the maximum rotational speed and the nominal rotational speed. Even more preferably, the rotational speed in the second gear falls in the middle between the nominal rotational speed and the maximum rotational speed. It is further preferred when the gear ratio of the second gear is chosen such that, after the shifting into the second gear, the electric drive machine operates in its range of optimal efficiency.

In order to achieve an acceleration that is as uniform as possible, the power output from the electric motor prior to the shifting preferably should substantially correspond to the power output after the shifting. If the rotational speed of the electric drive machine is still in the constant power range after the shifting from the first gear into the second gear, the same power can be output after the shifting as before the shifting. The sole difference is that the electric drive machine then rotates at a lower rotational speed, but with higher torque.

In order to maintain at the transmission output, even during the shifting, an output torque, which is as constant as possible, the transmission, as provided above, is on the one hand preferably configured such that the shifting time for "traversing" the neutral setting (position) is very short due to the distance, over which the sliding sleeve must be displaced from the full engagement position in the first gear up to the synchronization position for the second gear, being minimal. In fact, during shifting from the first into the second gear, briefly no direct torque transmission from the electric drive machine via one of the planetary transmissions occurs in this neutral position, since both ring gears are freely rotatable. However, the first ring gear is released only when the neutral position is reached, so that a supporting torque is generated in the first transmission by the inertial mass of the ring gear and the acceleration of the ring gear. As long as this "acceleration torque" of the ring gear does not change its direction, no complete load interruption occurs either. However, the torque depends both on the inertial mass of the ring gear and on the torque of the drive shaft of the drive motor. As long as the drive torque of the drive motor does not change sign, an output torque in the same direction (as before the shifting) is generated for generating propulsion even in the neutral position. The speed by which the sliding sleeve is movable from the first position into the synchronization position is set such that the neutral position exists only briefly.

Unlike in the neutral position, in the subsequent synchronization position of the sliding sleeve, a drive torque of the electric drive machine is again transmitted to the output shaft directly via the second planetary transmission. The torque, which is transmitted via the friction regions during the braking of the second ring gear, is thereby transmitted via the second planetary transmission. This depends on the dimensioning of the friction regions and on the contact force with which the friction regions are pressed against one another by the sliding sleeve. The friction regions and the sliding sleeve, and the actuator that moves the sliding sleeve, together form a friction clutch. As is usual in friction clutches, the size of the friction regions, their position with respect to one another, and the contact force are attuned to one another. In particular, they are attuned to one another for the particular application such that a maximum clutch torque is sustainably transmissible via the friction regions. This clutch torque is the torque that is transmitted during the friction engagement between the friction regions, and thus ultimately to the second synchronizer body.

The maximum clutch torque is preferably set such that it corresponds to the highest maximum rotational speed torque (maximum torque at maximum rotational speed). In this case this clutch torque is constantly transmitted in the synchronization position until the second ring gear is braked to zero, whereby the power transmitted during the synchronization ultimately decreases slightly due to the decreasing rotational speed. At the end of the synchronization and the engagement of the second ring gear (movement of the sliding sleeve into the second position that corresponds to the full engagement position), the output torque of the electric drive machine can subsequently be increased to a torque, which is now increased with respect to the maximum rotational speed torque, at the correspondingly lower rotational speed. Since, as specified above, the gear ratio of the second gear is preferably chosen such that the motor rotational speed is located in the constant power range, the torque can preferably be increased to the maximum output torque of the electric drive machine at the correspondingly lower rotational speed, so that the power output can be again substantially the power that was output before the shifting. In the region of the synchronization, the driver therefore experiences a slight power decrease that, however, is lifted immediately thereafter.

In order to reduce the time required for the synchronization, and to release the friction clutch (the friction regions), the output torque of the electric drive machine is preferably actively controlled during the synchronization. In particular, during the synchronization, the electric drive machine is preferably actively (electrically) braked and thus assists the braking by the friction clutch. The active (electric) braking is preferably effected such that the desired clutch torque (in the above case, the highest maximum rotational speed) is nevertheless transmitted by the clutch, but in a significantly shorter time owing to the braking.

It is particularly advantageous in this configuration that, with regard to the transmitting of the maximum power of the electric drive machine, the torque to be transmitted by the friction clutch is minimized at least at the start of the synchronization, and lies far below the nominal torque of the electric drive machine. The friction clutch can therefore be configured in a particularly compact manner. Furthermore, the friction clutch can be simply configured, since the actuator need only realize a prescribed constant contact force.

In a further preferred design, the maximum clutch torque can be set such that it corresponds to the maximum output torque of the electric drive machine after the shifting into the second gear, which is increased with respect to the maximum rotational speed torque. In this case the friction clutch can preferably further be designed such that the contact force of the friction regions against one another can be increased by the actuator during the synchronization such that, even during the synchronization, substantially the same (maximum) power is continuously transmitted. The torque transmitted by the coupling is thus preferably continuously increased, in a manner corresponding to the maximum output torque of the electric drive machine increasing with a decrease of the rotational speed, up to the maximum output torque at the synchronization rotational speed. In this design, the same power is thus output during the entire synchronization and thereafter as is output before the shifting; thus no load interruption takes place except possibly in the neutral position.

Also in this design, the maximum clutch torque is minimized, far below the nominal torque of the electric drive machine, and with respect to the maximum power of the drive machine continuously transmitted during the entire synchronization. Here the contact force of the actuator must be controlled/regulated to increase the clutch torque during the synchronization.

Also in the latter case, the electric drive machine is preferably actively electrically braked to release the clutch while maintaining the transmitting of a clutch torque.

Furthermore, the drive system can be modified in a wide variety of ways. Thus the clutch torque can be set to be lower than the maximum rotational speed torque. In this case the output torque of the electric drive machine can be reduced, before and during the shifting, to the clutch torque, so that shifting can again occur in a substantially load-interruption-free manner. The clutch torque ultimately always determines the maximum transmissible torque during the synchronization.

Using the active electric braking of the electric drive machine during the synchronization, the power to be transmitted by the friction clutch can be reduced. The energy loss (=heat) generated in the friction clutch during the slip phase of the friction clutch is reduced by the shorter shifting time. Depending on the design, the active braking can be omitted, or the electric drive machine can also deliver a positive torque during the synchronization. In a corresponding design, the friction clutch could ultimately also be used as an acceleration booster.

In further designs, the shifting from the first gear into the second gear can also be effected even at a shifting rotational speed that is lower than the maximum rotational speed of the electric drive machine. The shifting rotational speed can be a fixed rotational speed, at which it is shifted, or can be dynamically set to the power demand by the driver or in a manner dependent on alternative or additional parameters. The clutch can be adapted to the particular torque required for a substantially load-interruption-free shifting.

As is apparent from the above, in the present disclosure the term "substantially load-interruption-free" or "slight or no load interruption" or similar phrases in connection with the shifting of the transmission from the first into the second gear should preferably comprise a transmission or drive system in which the power (or the torque) available at the output shaft during the shifting from the first and the second gear is preferably positive continuously or only with a preferably short interruption, or its sign does not change and thus makes possible a preferred continuous, but not necessarily constantly strong, propulsion. The propulsion is also preferably substantially constant.

The drive system is preferably configured such that, in the neutral position, in a shifting process from the first gear into the second gear, a torque, which falls between 10% to 95%, still more preferably between 20% and 80%, and still more preferably between 25% and 75% of the maximum rotational speed torque (maximum torque at maximum rotational speed) of the electric drive machine, is preferably transmissible (and/or (in predetermined operating states) transmitted). The time, in which the neutral position with this torque transmission is occurring, preferably falls between 1 ms (milliseconds) and 100 ms, still more preferably between 3 ms and 10 ms, such as, for example, 5 ms or 8 ms. Furthermore, the drive system is preferably configured such that, in shifting processes from the first gear into the second gear in the synchronization position (during the synchronization), a torque, which is preferably between 30% and 300% of the maximum rotational speed torque, preferably between 50% and 250%, still more preferably between 80% and 200%, such as for example, 90%, 100%, 130%, or 180%, is at least temporarily transmissible (and/or (in predetermined operating states) is transmitted). The transmissible torque can be constant during the synchronization, or can be varied according to a prescribed function. At the end of the synchronization, the maximum torque to be transmitted from the friction clutch in the shifting process is preferably present. The duration of the synchronization is preferably between 10 ms and 2000 ms, more preferably between 50 ms and 500 ms, and still more preferably between 100 ms and 300 ms, such as, for example, 150 ms, 200 ms, or 250 ms. The short synchronization time is preferably achieved in particular by an active braking of the electric drive machine. The braking is preferably effected electrically, whereby energy is recuperable. The drive system therefore has a good degree of efficiency. Furthermore, the electric drive machine delivers the maximum rotational speed torque immediately before the shifting.

Furthermore, the drive system is preferably configured such that, in case the driver requires, at the shifting speed (preferably the maximum rotational speed), only a portion of the possible maximum power (and of the maximum rotational speed torque associated therewith), the shifting from the first gear into the second gear is also here initiated upon reaching the shifting speed (preferably the maximum rotational speed). Using the axial force generated by it, the actuator presses the synchronizer ring onto the friction cone, and generates a torque proportional to the axial force. During the shifting process, this can be constant or with increasing torque. A shifting with increasing torque has the advantage that the power remains constant during the shifting process, and thus directly follows the driver's demand. A shifting with constant torque has the advantage that the actuator need not be adjusted during the shifting process (shifting time approximately 0.3 s).

Furthermore, the drive system can be configured such that, in the case in which the driver reduces the power demand, for example, during the shifting, the torque transmitted via the friction clutch is reduced during the synchronization, so that the output torque is reduced after and/or during the shifting.

The terms "maximum rotational speed torque," "maximum power," etc. of the electric drive machine, are preferably to be understood on the basis of the respective characteristic values, which are specified by the manufacturer, for a continuous operation.

Furthermore, in the synchronization position of the sliding sleeve, the internal gearing is in engagement with none of the external gearings of the synchronizer bodies, and an axial force for the braking of the corresponding synchronizer body is preferably exerted on only one of the synchronizer rings. This is realized by situating the particular synchronizer ring, on which the axial force is applied, in a lock position with respect to the sliding sleeve, and by situating the respective other synchronizer ring just not in the lock position, but rather in full engagement, in which the tooth troughs are aligned with the tooth heads, i.e., they respectively lie on a common line.

BRIEF DESCRIPTION OF THE DRAWINGS

The invention is explained in the following by way of example and with further details with the aid of schematic drawings. In the Figures.

DETAILED DESCRIPTION OF THE INVENTION

Figure 1:
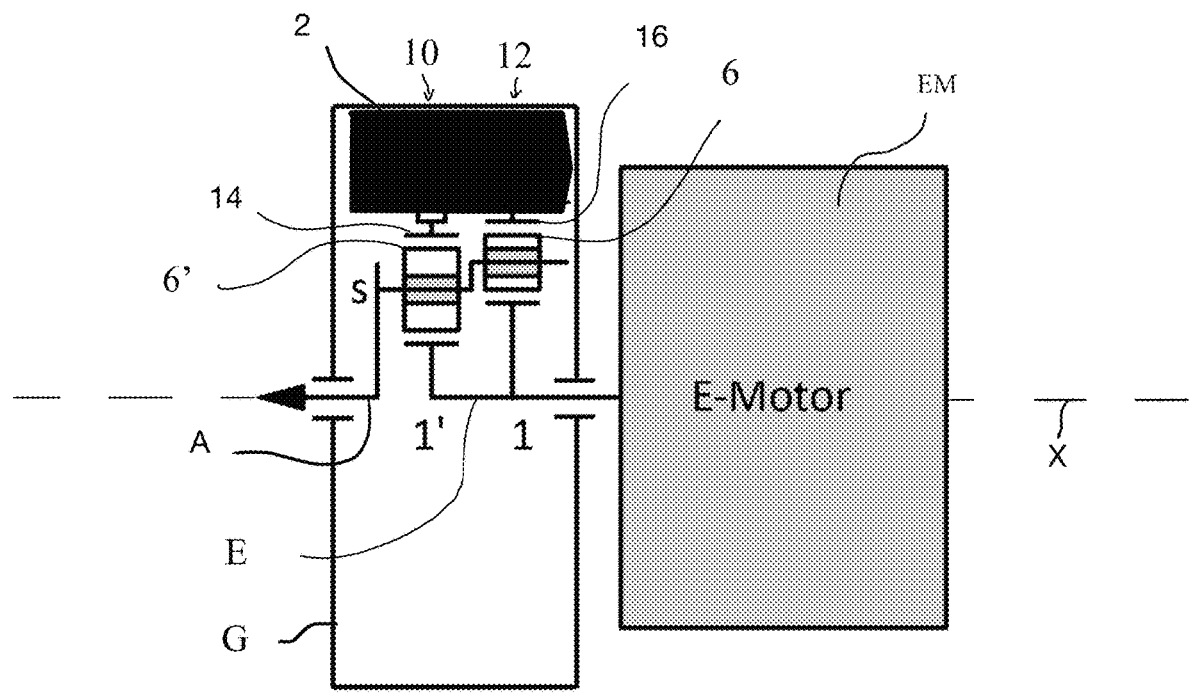
FIG. 1 shows a schematic representation of an electric drive system having a transmission according to a first embodiment.

A schematic diagram of an electric drive system having an electric drive machine (E-motor) EM and a two-speed transmission according to a first embodiment having two different sized sun gears 1' and 1, which are provided on a common input shaft E that serves as a drive for the sun gears, is shown in FIG. 1. The input shaft E is disposed coaxially with a rotational axis X and is supported in the housing G. In the housing, two ring gears 14, 16 are further supported coaxially with the rotational axis and to be rotatable about it. Furthermore, a locking device 2, which is provided for braking each one of the differently sized ring gears 14, 16, is provided. Furthermore, first planetary gears 6' and second planetary gears 6, which are supported on a common bridge (planet carrier) S to be rotatable about it, are provided. The bridge S is in turn supported such that it rotates about the rotational axis. One end of the bridge S is configured to be coaxial with the rotational axis X, and serves as output shaft A or an output. A plurality of such planetary gears 6' and 6 are preferably distributed around the circumference as planetary gear sets. The planetary gears 6' and 6 mesh with the ring gears 14 and 16 and the sun gears 1' and 1. A reverse transmission of the simplest design is respectively formed by a group that is respectively made of a sun gear, a planet set supported on a bridge, and a ring gear. In total, two planetary transmissions 10, 12 (in particular, reverse transmissions of the simplest design) disposed adjacent to each other are provided which, due to the different numbers of teeth/diameter of the individual gears, provide two gear ratios between input shaft E and output shaft A, which gear ratios are different from each other. Each of the two reverse transmissions 10, 12 can then transmit a torque from the input E to the output A only when the particular ring gear for the supporting of the torque is locked (stopped) with respect to the housing G by the locking device 2. The first planetary transmission 10 (input shaft E, sun 1', planetary gear 6', bridge S, ring gear 14) can thus transmit a torque only when the first ring gear 14 is held locked using the locking device 2. The second planetary transmission 12 can transmit torque in a corresponding manner by locking of the second ring gear 16.

Figure 2:
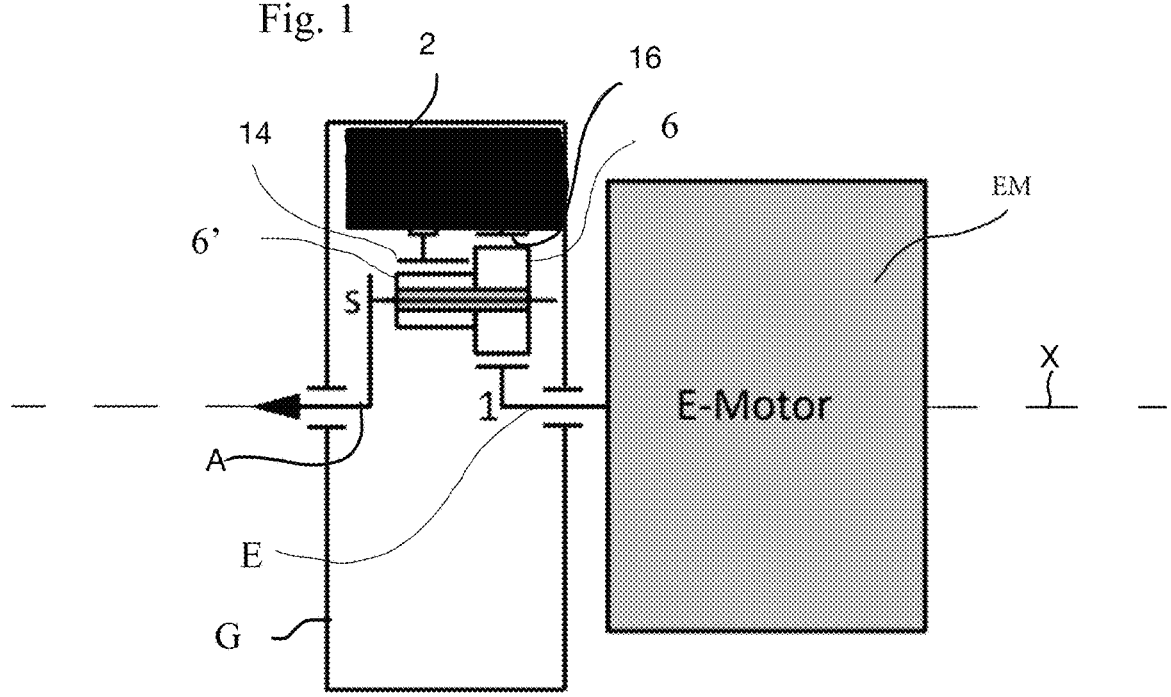
FIG. 2 shows a schematic diagram of an electric drive system having a transmission according to a second embodiment.

FIG. 2 shows a schematic diagram of an electric drive system having an electric drive machine (E-motor) EM and a two-speed transmission according to a second embodiment. In contrast to the transmission shown in FIG. 1, only a single sun gear 1 that is fixedly disposed on an input shaft E is provided; and per planetary gear set, the planetary gears 6 belonging to the first planetary transmission are respectively rigidly connected to the planetary gears 6' belonging to the second planetary transmission. These connected planetary gears are supported together on the bridge to be rotatable about it. In particular, the planetary gears 6' and 6, which are connected to each other such that they rotate together, can also be configured as a one-part stepped planetary gear. The different gear ratios of the first and second gears also arise here exactly as in FIG. 1 by locking one of the ring gears 14 and 16 using the locking device 2. For both transmissions, the output is the common bridge S, which also, as usual with reverse transmissions, transmits the highest torque.

The following applies to the transmission according to FIG. 1; The gear ratio $i_{1st\ gear}=i_{1'S}$ of the first gear (locking of the first ring gear 14) arises from the static gear ratio $i_{1'14}$ of the first reverse transmission 10 with $i_{1'14}=d_{H14}/d_{1'}$ with $i_{1'S}=1-i_{1'14}$ wherein
$d_{H14}$=diameter of the first ring gear 14
$d_{1'}$=diameter of the sun gear 1'

The gear ratio $i_{2nd\ gear}=i_{1S}$ of the second gear (locking of the second ring gear 16) arises from static gear ratio $i_{1\ 16}$ of the second reverse transmission with $i_{116}=d_{H16}/d_1$ with $i_{1S}=1-i_{1-16}$ wherein
$d_{H16}$=diameter of the second ring gear 16
$d_1$=diameter of the sun 1

The following applies to the transmission according to FIG. 2; The gear ratio $i_{1st\ gear}=i_{1S}$ of the first gear (locking of the first ring gear 14) arises from static gear ratio $i_{1\ 14}$ of the first reverse transmission with $i_{114}=(d_{H14}/d_{6'})*(d_6/d_1)$ with $i_{1S}=1-i_{114}$ wherein=
$d_{H14}$=diameter of the first ring gear 14
$d_1$=diameter of the sun 1
$d_{6'}$=diameter of the smaller planetary gear 6'
$d_6$=diameter of the larger planetary gear 6

The gear ratio $i_{2nd\ gear}=i_{1S}$ of the second gear (locking of the second ring gear 16) arises from static gear ratio $i_{1\ 16}$ of the second reverse transmission with $$i_{116}=d_{H16}/d_1 \text{ with}$$

$$i_{1S}=1-i_{116}$$

wherein=
$d_{H16}$=diameter of the second ring gear 16
$d_1$=diameter of the sun 1

The difference of the two transmissions is in the achievable gear ratio range. By way of example, for the gear ratio range $i_{2nd\ gear}\approx+2$ and $i_{1st\ gear}\approx+5$, the transmission from FIG. 1 is used and, for the gear ratio range $i_{2nd\ gear}\approx+8$ and $i_{1st\ gear}\approx+15$, the transmission from FIG. 2 is used.

For the gear ratios of FIG. 1, the gear ratios its result from the two simple reverse transmissions $i_{1'\ 14}$ and $i_{1\ 16}$.

Starting from the two above-mentioned embodiments, the locking device 2 common to the two transmissions is described based on the second embodiment from FIG. 2 with reference to the further Figures. Here it is to be noted that FIGS. 1 and 2 respectively are only schematic diagrams from which the actual arrangement of the individual components, their dimensions, etc. do not necessarily follow or do not follow in all aspects. FIGS. 3 to 10 are more precise in this respect and also, however, represent schematic diagrams of a possible actual design, but not true to scale. In particular, the Figures are in part depicted at different magnifications among one another and possibly also not completely rigorously with respect to one another.

If not indicated otherwise, identical reference numbers mean that the same respective component is intended. Not all reference numbers are indicated in all Figures, but rather only those that are particularly relevant. Components not specified in individual Figures, which components have received a reference number in other Figures, are therefore unchanged unless indicated otherwise.

In addition to the details of the locking device 2, portions of the housing G and portions of the ring gears 14, 16 are shown in FIGS. 3, 5, 8 and 11. The rotational axis X is located below in each and is not depicted.

Using the locking device 2, the first ring gear 14 or the second ring gear 16 is selectively lockable to the housing G so that, when the first ring gear 14 is locked, a torque is transmissible from the input shaft E to the output shaft A via the first planetary transmission and, when the second ring gear 16 is locked, a torque is transmissible from the input shaft E to the output shaft A via the second planetary transmission 12.

As shown in the first cross-sectional view of FIG. 3, the locking device 2 is configured as follows:

a cylindrical sliding sleeve 18, which is coaxial with the rotational axis, is provided in the housing G to be non-rotatable relative to the housing G and to be axially movable along the rotational axis X. For this purpose, the sliding sleeve 18 includes a gearing on the external side, and the housing G includes a gearing (for example, spline 19) on the internal side. The sliding sleeve further includes an internal gearing 20.

A cylindrical first synchronizer body 22 is rigidly connected with the first ring gear 14 (for example, press fitted) or is formed as one-part (integrally) therewith and is provided on an outer circumference of the ring gear. The first synchronizer body 22 has an external gearing 24 configured to be coaxial with the rotational axis, which external gearing 24 is configured such that it is bringable into engagement with the internal gearing 20 of the sliding sleeve 18 by moving the sliding sleeve 18 along the rotational axis X. The diameter of the internal gearing 20 of the sliding sleeve 18 is thus greater than the outer diameter of the smaller first ring 14. A cylindrical second synchronizer body 26 is rigidly connected with the second ring gear 16 (for example, press-fitted) or is formed as one-part (integral) therewith. In particular, the second ring gear 16 is connected on an outer side to a cylindrical connecting component 17 such that they rotate together, if it is not integrally formed together. The connecting component extends axially toward the first synchronizer body 22 with a radially inwardly stepped section; the second synchronizer body 26 is provided on the axial end projection of the radially inwardly stepped section. It is thereby made possible that the second ring gear 16 has a greater diameter than portions of the locking device. Furthermore, this makes it possible that the second ring gear 16 is disposed substantially adjacent to the locking device 2. The radial installation space of the transmission can thus be optimized.

The second synchronizer body 26 has an external gearing 28 configured to be coaxial with the rotational axis X, which external gearing 28 is configured such that it is bringable into engagement with the internal gearing 20 of the sliding sleeve 18 by moving the sliding sleeve 18 along the rotational axis X. On the side facing the second synchronizer body 26, the first synchronizer body 22 has an axial projection that is formed as friction region 30, which conically tapers toward the second synchronizer body 26. On the side facing the first synchronizer body 22, the second synchronizer body 26 has an axial projection that is formed as friction region 32, which conically tapers toward the first synchronizer body 22. The first and the second synchronizer bodies 22, 26, or the ring gears 14 and 16 onto which they are attached, are supported in a substantially not axially displaceable manner. The friction regions can be formed integrally or as a coating.

Furthermore, a first synchronizer ring 34, which is disposed to be coaxial with the rotational axis, is provided. The first synchronizer ring 34 has an external gearing 36 that is configured such that it is bringable into engagement with the internal gearing 20 of the sliding sleeve 18 by moving the sliding sleeve 18 along the rotational axis X (radial overlapping). Furthermore, on the side facing the second synchronizer body 26, the first synchronizer ring 34 has a projection region that includes a friction region 38, which conically tapers on the inner-circumference side toward the second synchronizer body 26. The friction region 38 is configured such that, when an axial force is applied to the first synchronizer ring 34 in the direction toward the first synchronizer body 22, the friction region 38 can form a friction engagement with the friction region 30 of the first synchronizer body 22.

Figure 3:
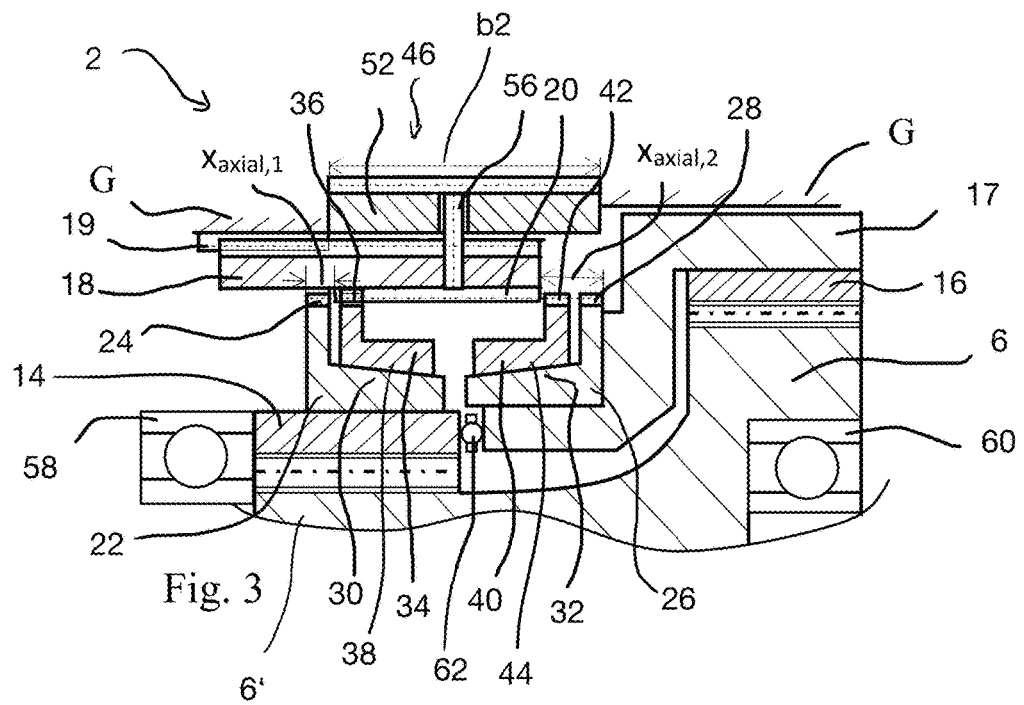
FIG. 3 shows a detail section of a first cross-sectional view of the transmission according to the second embodiment in a neutral position.

The first synchronizer ring 34 further has at least one radially outwardly protruding pre-synchronization projection on its side of the external gearing 36 that faces the second synchronizer body 26; the pre-synchronization projection is not shown in the first cross-sectional view of FIG. 3, but is configured as is usual for synchronized transmissions. In a corresponding manner, the sliding sleeve 18 has, on its inner circumferential side, a pre-synchronization groove, which also is not shown but is configured as usual. Via the pre-synchronization projection and the pre-synchronization groove, the first synchronizer ring 34 is preferably supported radially in the sliding sleeve independently of the axial position (i.e., at every position) of the sliding sleeve. The pre-synchronization projection and the pre-synchronization groove are further configured such that a relative rotation of the first synchronizer ring 34 with respect to the sliding sleeve 18 by a predetermined angle between a lock position and a released position is possible. A further rotation of the first synchronizer ring 34 with respect to the sliding sleeve 18 is prevented. The released position is defined as a relative rotation position, at which the teeth of the first synchronizer ring 34 are aligned with the teeth of the sliding sleeve 18, i.e., at which the sliding sleeve 18 is freely displaceable from a position, in which the internal gearing 20 is not in engagement with the external gearing 36 of the first synchronizer ring 34, into an engagement position. Conversely, the lock position is defined as a relative rotation position, at which the front ends in the axial direction of the tooth heads of the synchronizer ring 34 are offset in the circumferential direction with respect to the tooth bases of the sliding sleeve; i.e., they are relatively rotated with respect to the aligned position.

The first synchronizer ring 34 is radially supported in the sliding sleeve in an axially displaceable manner, and, depending on the axial position, is also supported via its conical friction region 38 on the conical friction region 30 of the first synchronizer body 22. A displacement of the first synchronizer ring 34 toward the external gearing 24 of the first synchronizer body 22 causes the contact pressure, with which the friction regions lie against one another, to increase, which also leads to an increased friction between the first synchronizer body 22 and the first synchronizer ring 34. This contact pressure also limits a movement in this direction. An opposing movement of the first synchronizer ring 34 away from the external gearing 24 of the first synchronizer body 22 leads to a reduction of the contact pressure, so that the friction is also reduced. The movement away from the external gearing 24 can be limited, for example, by a locking strut 39, etc., which is not shown in the first cross-sectional view of FIGS. 3, 5, 8 and 11. The first synchronizer ring 34 is therefore movably (in a bounded manner) supported on the first synchronizer body 22.

Furthermore, a second synchronizer ring 40, which is preferably formed in a symmetrical manner with a respect to a symmetry plane between the first and second synchronizer bodies, which symmetry plane is perpendicular to the rotational axis, is provided, the second synchronizer ring 40 being disposed coaxially with the rotational axis. The second synchronizer ring 40 has an external gearing 42 that is configured such that it is bringable into engagement with the internal gearing 20 of the sliding sleeve 18 by moving the sliding sleeve 18 along the rotational axis X. The second synchronizer ring 40 further has a projection region on the side facing the first synchronizer body 22, which projection region includes a friction region 44 that conically tapers on the inner circumference side toward the first synchronizer body 22. The friction region 44 is configured such that it can form a friction engagement with the friction region 32 of the second synchronizer body 26. The second synchronizer ring 40 as well as the first synchronizer ring 34 have a not-shown pre-synchronization projection that is held in a correspondingly configured pre-synchronization groove, and is relatively rotatable between a lock position and a released position in a manner analogous to the first synchronizer ring 34. The supporting and increasing or reducing of the contact pressure is analogous (but mirror-reversed) to the first synchronizer ring 34.

The external gearing 24 of the first synchronizer body 22 is preferably substantially symmetric with respect to the external gearing 28 of the second synchronizer body 26, and the external gearing 36 of the first synchronizer ring 34 is preferably substantially symmetric with respect to the external gearing 42 of the second synchronizer ring 40, respectively, with respect to a symmetry plane lying between them.

Figure 4:
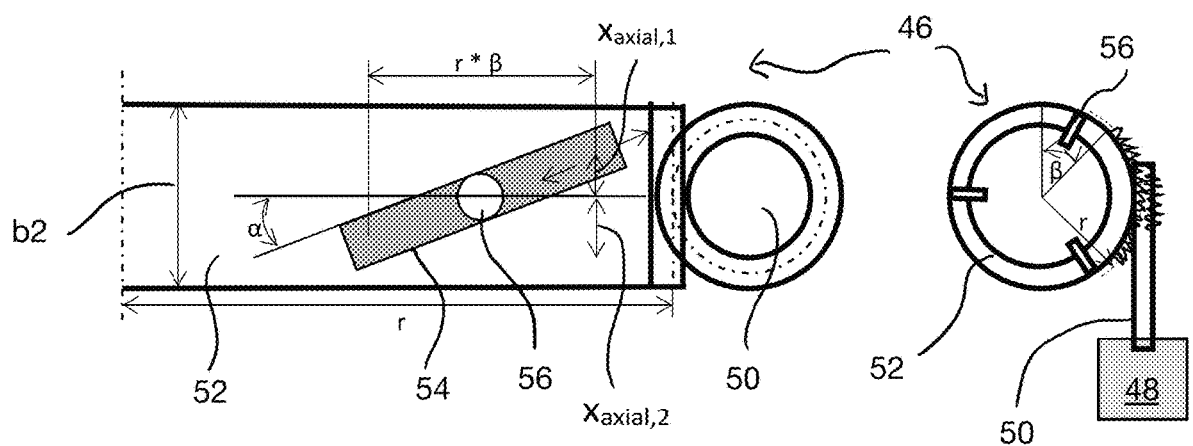
FIG. 4 shows a detailed representation of a displacing device of the transmission according to the second embodiment in the neutral position.

Furthermore, a displacing device 46, which is also depicted in particular in more detail in FIG. 4, is provided for displacing the position of the sliding sleeve 18 along the rotational axis X.

The displacing device 46 includes an electric motor 48 for driving a worm shaft 50. Both are supported in the housing G. Using the worm shaft 50, a worm gear 52 is driven via an external gearing provided on the worm gear. The worm gear 52 is disposed coaxially with the sliding sleeve 18 and is rotatable relative to it about the rotational axis X. The worm gear 52 is provided on the outer circumference side with respect to the sliding sleeve 18, and does not contact it or is at least basically freely rotatable about it. The worm gear 52 is supported in the housing in an axially non-displaceable manner. The worm gear 52 is axially guided between two housing parts and is supported radially, wherein the partition plane (contact surface between the two housing parts) is not depicted, and is freely selectable by the designer within the width b2 of the worm gear.

The worm gear 52 further includes a plurality of guide grooves 54 that extend in a straight line manner over a predetermined length along the circumferential direction, but are inclined with respect thereto by an angle α. Here the length in the circumferential direction is r*β in radian measure, with β as the rotational angle of the worm gear 52 between the one end position and the other end position, and r as the radius of the worm gear. The guide grooves 54 are formed at least on an inner circumference side or extend completely through the worm gear 52 in their depth direction.

Furthermore, multiple guide pins 56, which protrude radially outwardly, are provided on the sliding sleeve 18, which guide pins 56 are preferably rigidly provided on the sliding sleeve, for example, by press fitting. Here the guide pins 56 and the guide grooves 54, or the arrangement of the sliding sleeve 18 and the worm gear 52, are configured such that, in the assembled state of the transmission, each of the guide pins 56 is guided in one of the guide grooves 54. As already indicated above, the sliding sleeve 18 is radially supported, in a displaceable manner in the axial direction, in the housing G via an external gearing on the inner side along the gearing 19. The displacing and guiding of the sliding sleeve 18 in the axial direction is achieved using the guide pins 56. These are guided in the guide grooves 54 such that, by rotating the worm gear 52, the position of the sliding sleeve 18 is displaceable in the axial direction. In particular, starting from a desired travel distance $x_{Total} = x_{axial1} + x_{axial2}$ of the sliding sleeve 18 (see FIG. 4) and a prescribed inclination a of the guide groove with respect to the circumferential direction, the following angle of rotation $\beta_{Total}$ (in radian measure) of the worm gear results:

$$\beta_{Total} = (x_{axial1} + x_{axial2})/\tan \alpha * r$$

Here the total travel distance $x_{Total} = x_{axial1} + x_{axial2}$ corresponds to the distance that the sliding sleeve 18 must travel in the axial direction from a full engagement with the first synchronizer body 22 to a full engagement with the second synchronizer body 26. Using the inclination angle α, the force ratio for applying an axial force using the sliding sleeve to establish the synchronization can be set.

Furthermore, the sliding sleeve 18 is configured such that it has a width that is greater than the spacing of the external gearings 36, 42 of the synchronizer rings 34, 40 in the axial direction (=there is a position, at which both synchronizer rings are in engagement) and is smaller than the distance in the axial direction (in the synchronization position, the opposing synchronizer body is no longer in engagement) of the external gearings 24, 28 of one of the synchronizer bodies 22, 26 to the respective opposing synchronizer ring 34, 40 (associated with the other synchronizer body).

The gearings that engage in each other during shifting from the first gear to the second gear, i.e., the external gearings 24, 28 of the synchronizer bodies 22, 26, the external gearings 36, 42 of the synchronizer rings 34, 40, and the internal gearing 20 of the sliding sleeve 18, have the above-described chamfered teeth, in which the axial tooth ends converge to a point or converge to the shape of a triangle.

Preferably there are additional bearings 58 and 60 for supporting the stepped planets 6, 6', and a bearing 62 that provides an axial supporting of the ring gears 14 and 16.

Figure 7:
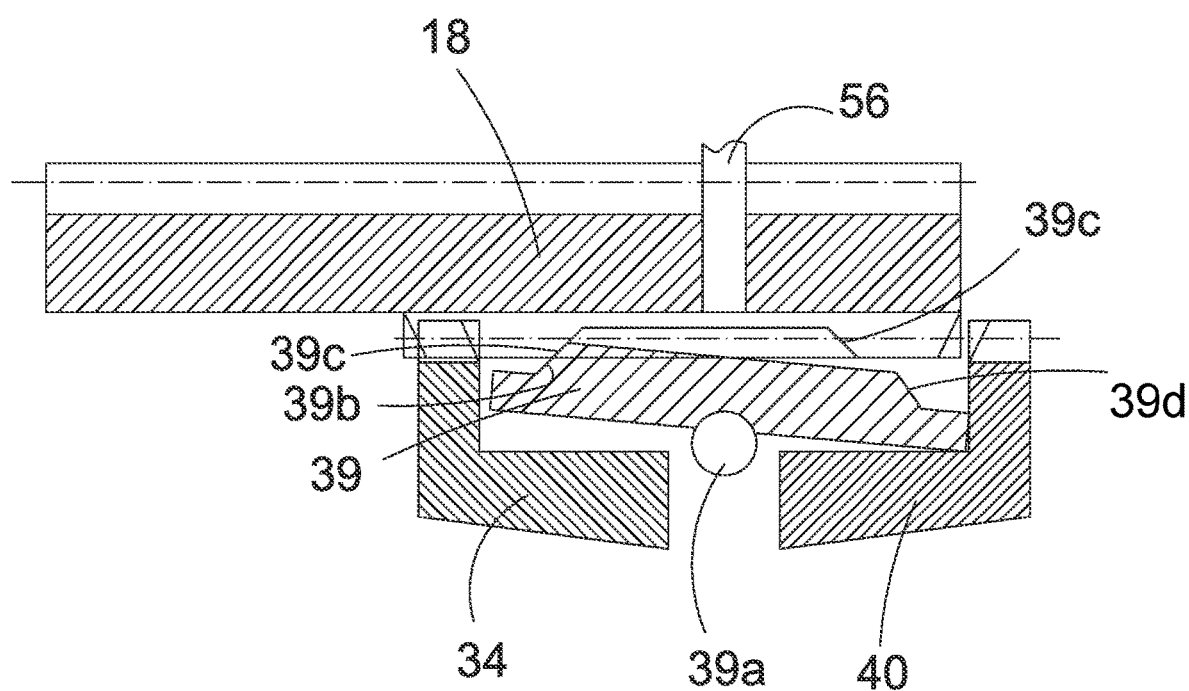
FIG. 7 shows a detail section of a second cross-sectional view of the transmission according to the second embodiment in a pre-synchronization position for the second gear.
Figure 8:
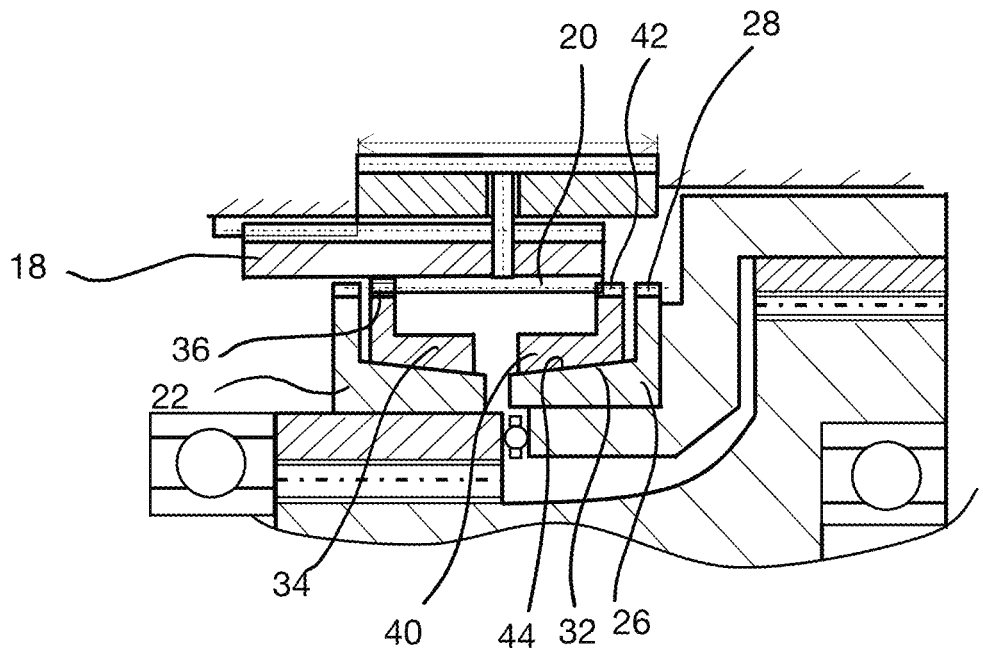
FIG. 8 shows a detail section of the first cross-sectional view of the transmission according to the second embodiment in the synchronization position for the second gear.
Figure 10:
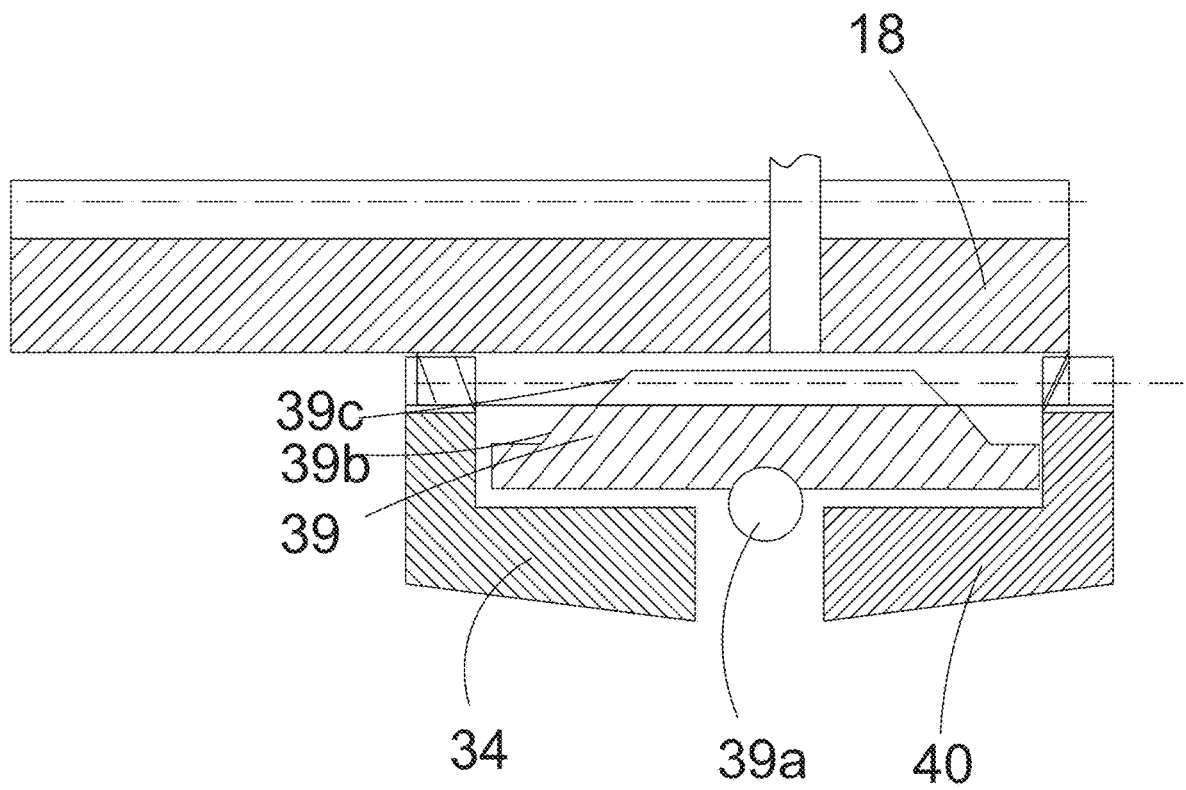
FIG. 10 shows a detail section of the second cross-sectional view of the transmission according to the second embodiment in the synchronization position for the second gear.
Figure 13:
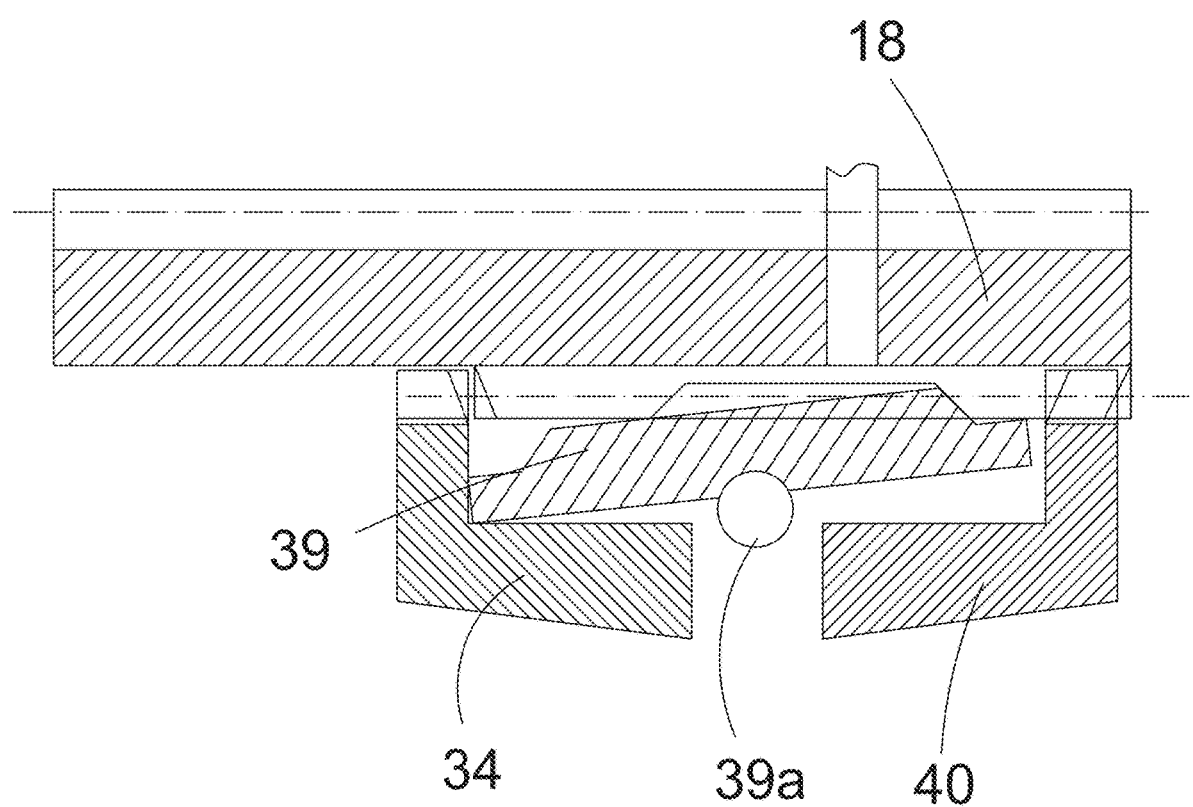
FIG. 13 shows a detail section of the second cross-sectional view of the transmission according to the second embodiment in a pre-synchronization position for the first gear.

Furthermore, as can be seen from the second cross-sectional views in FIGS. 7, 10 and 13, which are different from the first cross-sectional views in FIGS. 3, 5, 8 and 11, the locking strut 39 is provided, using which a so-called pre-synchronization is achievable for displacing the synchronizer rings 34, 40 into the lock position. The locking strut 39 is disposed in a space that is delimited on the outer circumference side by the sliding sleeve 18, on the inner circumference side by the outer-circumference sides of the friction regions 38, 44 of the synchronizer rings 34, 40, and in the axial direction by the radially outwardly protruding external gearings 36, 42 of the synchronizer rings 34, 40. The locking strut 39 is preloaded, radially outward against a corresponding locking-strut receiving region that is formed on the inner-circumferential side of the sliding sleeve 18, by a spring 39a that is disposed and attached in the circumferential direction inside the sliding sleeve 18. At its ends in the axial direction, the locking strut 39 is truncated on the outer circumference side with respect to a central part, and thus has two oblique abutment surfaces 39b. Centrally radially outside the synchronizer rings 34, 40, the locking-strut receiving region includes a recess and thus has two oblique abutment surfaces 39c corresponding to the abutment surfaces 39b. The oblique abutment surfaces 39c in the locking-strut receiving region are disposed closer to each other in the axial direction than the oblique abutment surfaces 39b of the locking strut 39. The locking strut is thus not insertable into the recess with both abutment surfaces 39b simultaneously.

Overall, the locking strut 39 having its abutment surfaces 39b, and the locking-strut receiving region having its abutment surfaces 39c, are configured such that at least the following relevant positions can be achieved: the locking strut 39 is disposed parallel to the sliding sleeve 18, and none of the abutment surfaces come into contact with one another (see FIG. 10). In this position, the abutment surfaces 39b of the locking strut 39 are disposed, for example, in front of and behind the abutment surfaces 39c of the sliding sleeve 18 in the axial direction. Or, the locking strut 39 is axially displaced and tilted perpendicularly to the circumferential direction such that one of the abutment surfaces 39b of the locking strut 39 is in engagement with the corresponding abutment surface 39c (see FIGS. 7 and 13). Only in the latter case can an axial force be exerted by the sliding sleeve 18 onto the locking strut 39. In total, preferably at least three locking struts 39 are provided.

In the following, individual operating states and positions of the transmission are described:

FIGS. 3 and 4 show a neutral position of the sliding sleeve 18 in which the vehicle is stationary, for example. Even when the motor (the input shaft; drive machine) is rotating, no torque can be transmitted, since the inner gearing 20 of the sliding sleeve 18 is only in engagement with the external gearing 36 of one of the synchronizer rings (here, of the first synchronizer ring 34) and, owing to the lack of an axial force, the first synchronizer ring 34 also is not in friction engagement with the first synchronizer body 22. Even if the sliding sleeve 18 were to be moved toward the first synchronizer body 22, substantially no axial force would be exertable onto the first synchronizer ring 34 via the internal gearing 20 of the sliding sleeve 18 due to the complete tooth engagement with the external gearing 36 of the first synchronizer ring 34. A synchronization would thus not take place. Therefore, to engage the first gear when the vehicle is stationary, the motor must be stopped starting from this neutral position.

Figure 5:
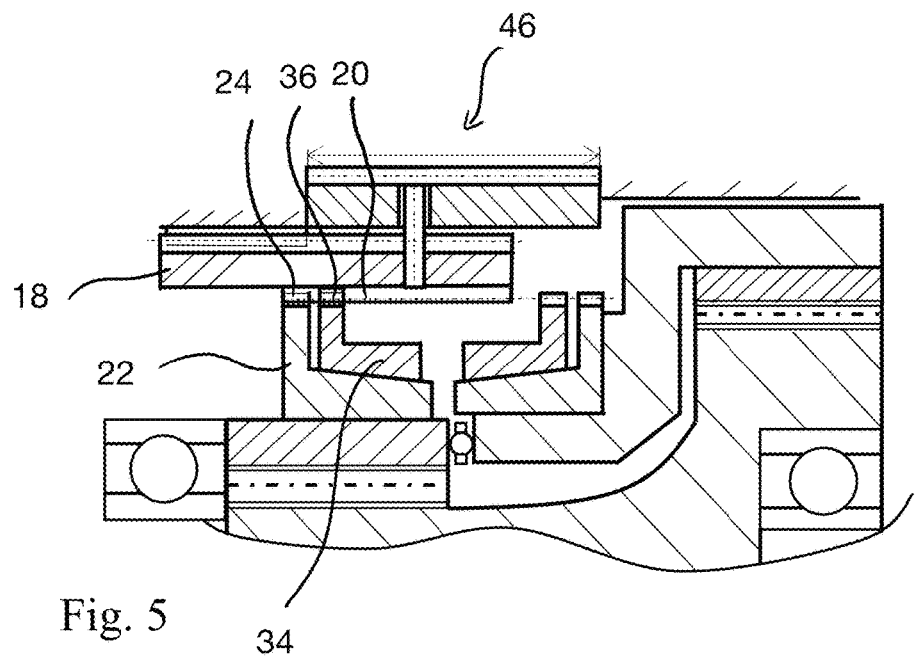
FIG. 5 shows a detail section of the first cross-sectional view of the transmission according to the second embodiment in which the first gear is engaged.
Figure 6:
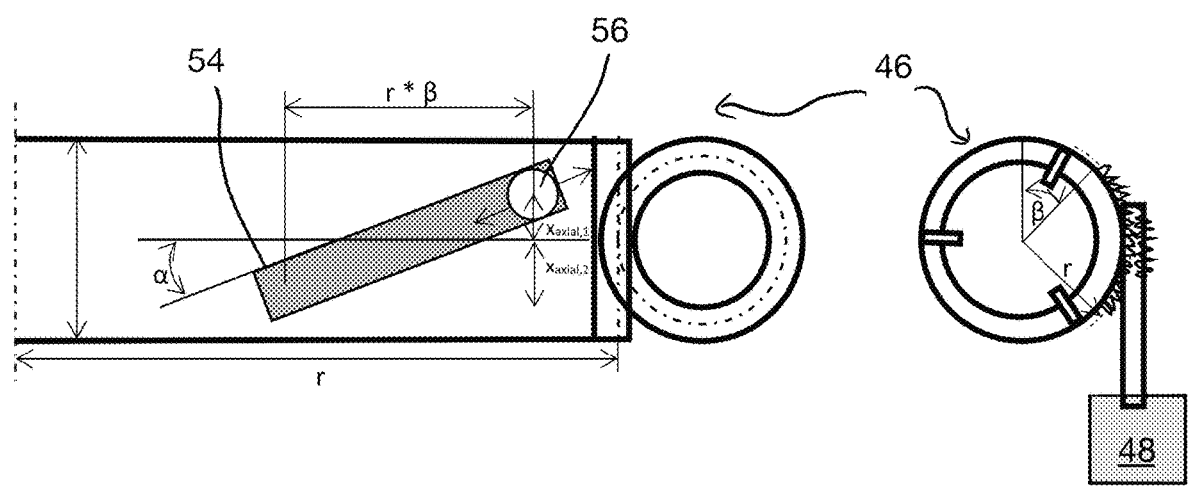
FIG. 6 shows a detail representation of the displacing device of the transmission according to the second embodiment in a state in which the first gear is engaged.

Starting from the neutral position, when the motor and vehicle are stationary, the first gear can be engaged by moving the sliding sleeve 18 using the displacing device 46 by the distance $x_{axial,1}$ toward the first synchronizer body 22 (see FIG. 3). The position of the sliding sleeve, when the first gear is fully engaged, is shown in FIGS. 5 and 6. For full torque transmission, the internal gearing 20 of the sliding (shifting) sleeve 18 is in full tooth engagement with the external gearing 24 of the first synchronizer body 22 in the first-gear position. "Full tooth engagement" means here that the entire width of the external gearing 24 is in engagement with the internal gearing 20. Accordingly, a tooth engagement or contact of the internal gearing 20 of the sliding sleeve 18 with the second synchronizer ring 40 or the second synchronizer body 26 does not exist. As can be seen from FIG. 6, in the first-gear position the guide pin 56 is disposed in one end position of the guide groove.

For the engaging of the first gear, the sliding sleeve 18 therefore need only travel the short distance $x_{axial,1}$, wherein this distance substantially corresponds to the width of the external gearing 24 of the first synchronizer body 22 (actually, the distance corresponds to the width plus the spacing that the internal gearing 20 has to the external gearing 24 of the first synchronizer body 22 in the neutral position).

If shifting now occurs into the second gear having the lower gear ratio while the motor is rotating and the vehicle is driving, the sliding sleeve 18 is moved by the shifting device 46 starting from the first-gear-position in the direction toward the second synchronizer body 26 in order to release a rotation of the first ring gear 14 and to stop or lock the rotating second ring gear 16. In this movement, the neutral position shown in FIGS. 3 and 4, in which only the first synchronizer ring 34 is in engagement with the sliding sleeve 18, is first traversed again.

At the latest in the movement of the sliding sleeve 18 into the neutral position, only the abutment surface 39b of the locking strut 39 that faces the first synchronizer ring 34 immerses into the pre-synchronization groove, so that locking strut 39 is brought into a position tilted with respect to the axial direction.

In the further movement, the sliding sleeve 18 reaches a pre-synchronization position shown in FIG. 7, in which starting from the neutral position the locking strut is pushed toward the second synchronizer ring 40 owing to the abutment surface 39c of the sliding sleeve 18 and abutment surface 39b of the locking strut 39 coming into abutment. The locking strut 39 thereby comes into abutment against the second synchronizer ring 40 and displaces it toward the second synchronizer body 26.

In this pre-synchronization position, a first friction engagement thereby arises between second synchronizer ring 40 and the second synchronizer body 26, which in turn results in a torque on the second synchronizer ring 40. Due to this torque (in the rotational direction of the second ring gear), the second synchronizer ring 40 is brought into its lock position (relative rotation position) with respect to the sliding sleeve 18, whereby the gearings are displaced toward each other.

In the further movement of the sliding sleeve 18 into a synchronization position (see FIGS. 8 to 10), the axial ends of the gearing (chamfered teeth) of the sliding sleeve 18 impinge against the axial ends of the gearing (chamfered teeth) of the second synchronizer ring 40, whereby a higher axial force is applied onto the second synchronizer ring 40. This leads to a strengthened friction engagement, which in turn results in an increased transmission of torque (braking torque) between the second synchronizer body 26 and the second synchronizer ring 40. A further movement of the sliding sleeve 18 toward the second synchronizer body 26 is thereby blocked by the not-aligned gearings.

As is shown in FIG. 10, in the movement of the sliding sleeve 18 from its pre-synchronization position into its synchronization position, the locking strut 39 held by the spring 39a relatively rotates itself into an orientation parallel to the sliding sleeve, since the abutment surfaces 39b, 39c slip against each other. Starting from the synchronization position shown in FIG. 10, a further movement of the sliding sleeve 18 toward the second synchronizer body 26 is not obstructed.

In the synchronization position, the external gearing 36 of the first synchronizer ring 34 is still in engagement with the internal gearing 20 of the sliding sleeve 18. Between the first synchronizer ring 34 and the first synchronizer body 22, substantially no friction torque acts on the synchronizer body 22 owing to the lack of an axial force toward the first synchronizer body 22. The first synchronizer body 22 is accelerated with the braking of the second synchronizer body 26. Due to the simultaneous braking and the acceleration, a torque that arises from the torque of the synchronizer ring is still transmitted to the output shaft, i.e., to the bridge S.

Figure 9:
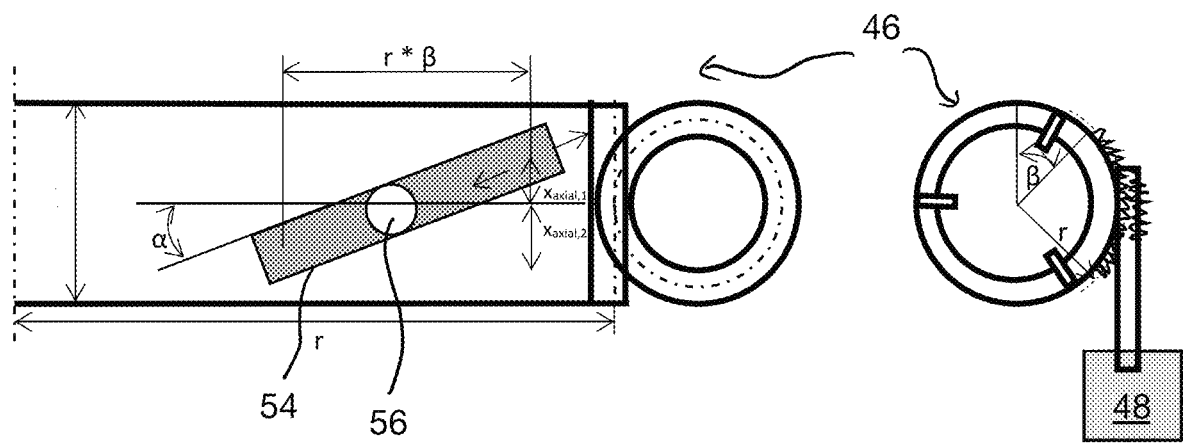
FIG. 9 shows a detail representation of the displacing device of the transmission according to the second embodiment in the synchronization position for the second gear.

As can be seen from FIG. 9, in the synchronization position the guide pin 56 is located inside the guide groove 54 slightly below the above-described neutral position.

As soon as the second synchronizer body 26 is stopped, the torque transmitted via the chamfer surfaces (axial tooth ends) of the gearings of the sliding sleeve 18 and of the second synchronizer ring 40 onto the second synchronizer ring 40 decreases (additional torque is no longer present). In the further movement of the sliding sleeve 18 toward the second synchronizer body 26, the oblique surfaces of the gearings of the sliding sleeve 18 and of the synchronizer ring 40 slip against each other, and the second synchronizer body 26 thereby aligns with the sliding sleeve 18. The internal gearing 20 of the sliding sleeve 18 substantially simultaneously comes out of engagement with the external gearing 36 of the first synchronizer ring 34.

Figure 11:
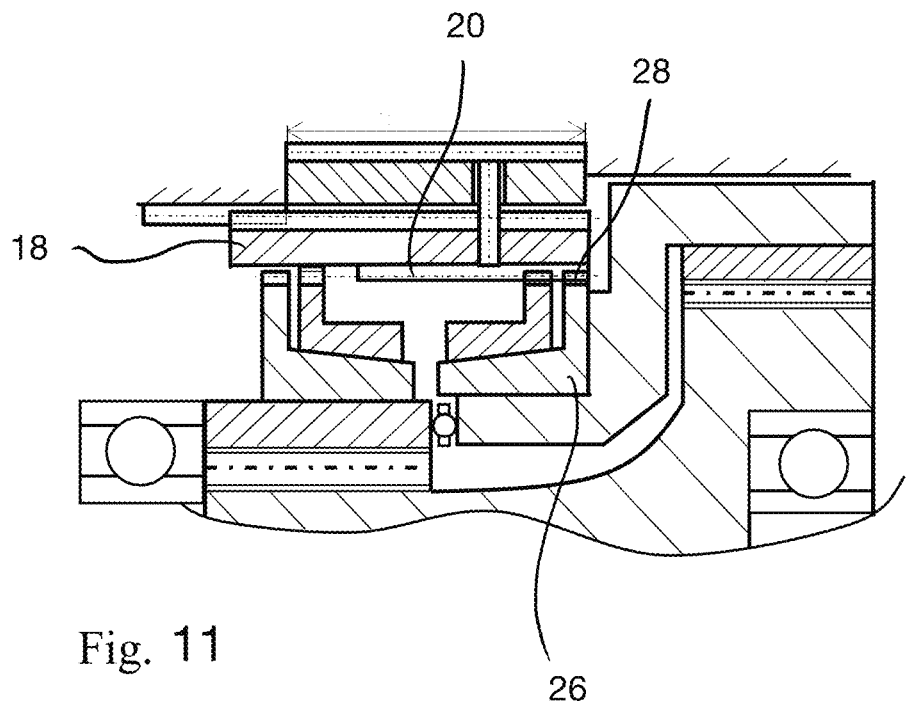
FIG. 11 shows a detail section of the first cross-sectional view of a transmission according to the second embodiment, in which the second gear is engaged.
Figure 12:
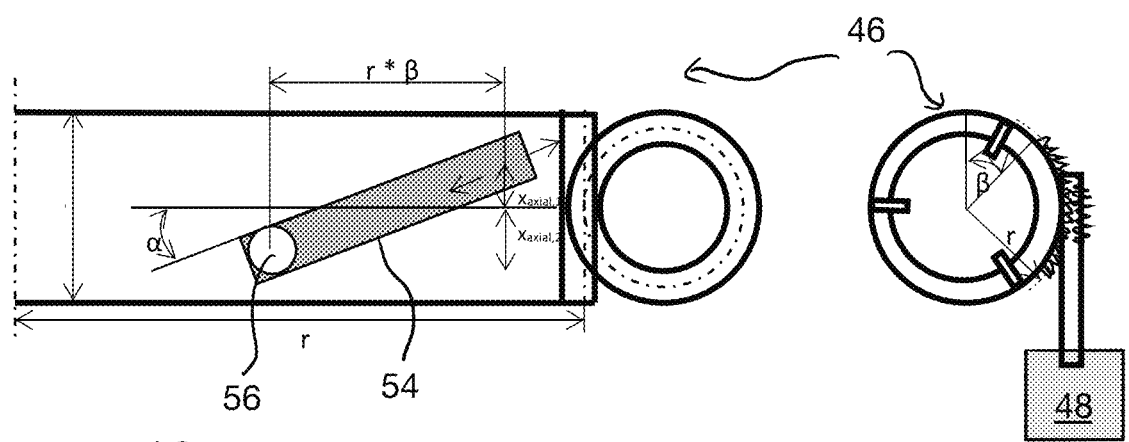
FIG. 12 shows a detail representation of the displacing device of the transmission according to the second embodiment in a state in which the second gear is engaged.

FIGS. 11 and 12 show the end position of the sliding sleeve 18 in which the second gear is engaged (second-gear position). As also with the first-gear position, the internal gearing 20 of the sliding sleeve 18 is in engagement with the external gearing 28 of the second synchronizer body 26 over the entire width of the external gearing 28 of the second synchronizer body 26. As can be seen from FIG. 12, in the second-gear position the guide pin 56 is disposed in an opposite end position of the guide groove 54.

For the engaging of the second gear, starting from the neutral position the sliding sleeve 18 thus substantially need only travel the distance $x_{axial,2}$, wherein this distance substantially corresponds to the width of the external gearing 28 of the second synchronizer body 26 plus the width of the external gearing 42 of the second synchronizer ring 40 (actually, the distance corresponds to the width of the external gearings plus the distance the internal gearing 20 has to the external gearing 42 of the second synchronizer ring 40 in the neutral position, plus the spacing between the external gearings of the second synchronizer body 26 and of the second synchronizer ring 40). In particular it is further to be noted that, at latest starting from the reaching of the synchronization position, there is a high torque on the output again, so that a load interruption occurs, if at all, only in the region of the movement through the neutral position and the pre-synchronization position, which load interruption, however, is very short due to the short time- and distance-duration of these positions and the acceleration torque of the other synchronizer body.

The above sequence occurs with a changed direction during the shifting from the second gear to the first gear. Another neutral position is first traversed, in which only the second synchronizer ring 40 is in engagement with the sliding sleeve 18. In this position, the locking strut 39 is also tilted away from the above-described position, i.e., the abutment surface 39b facing the second synchronizer body is immersed into the pre-synchronization groove. In the further movement of the sliding sleeve, a pre-synchronization position for aligning the first synchronizer ring 34 with respect to the sliding sleeve 18 in the lock position is achieved in an analogous manner (see FIG. 13). The braking of the first synchronizer body 22 subsequently occurs (not shown) in a further synchronization position for the first gear.

The width of the internal gearing 20 of the sliding sleeve 18 is preferably 10% smaller, still more preferably 5% smaller, and still more preferably 1% smaller than the distance of the external gearings 24, 28 of one of the synchronizer bodies 22, 26 to the respective opposing (associated with the respective other synchronizer body) synchronizer ring 40, 34.

A further third embodiment, which is not depicted, will be explained in the following.

Unless indicated otherwise, all features and positions of the first and second embodiment also apply to the third embodiment.

A transmission includes a housing, in which a drive shaft is supported. A sliding sleeve is supported on the drive shaft such that they rotate together, but the sliding sleeve is movable along a movement axis. The sliding sleeve has an internal gearing having a radial spacing to the drive shaft. On the drive shaft, there is provided, on the one side of the sliding sleeve, a first synchronizer body having an externally geared region, which is bringable into engagement with the internal gearing of the sliding sleeve by moving the sliding sleeve along the movement axis, and having a friction region that is formed radially inside, and is axially displaced toward the sliding sleeve with respect to the externally geared region. On the other side of the sliding sleeve, there is provided on the drive shaft a second synchronizer body having an externally geared region, which is bringable into engagement with the internal gearing of the sliding sleeve by moving the sliding sleeve along the movement axis, and having a friction region that is formed radially inside, and axially displaced toward the sliding sleeve with respect to the externally geared region. Furthermore, a first synchronizer ring is provided with an external gearing that is bringable into engagement with the internal gearing of the sliding sleeve by moving of the sliding sleeve along the movement axis, and with a friction region that is configured for support and for friction engagement on the friction region of the first synchronizer body. In an analogous manner, a second synchronizer ring is provided with an external gearing that is bringable into engagement with the internal gearing of the sliding sleeve by moving of the sliding sleeve along the movement axis, and with a friction region that is configured for support and for friction engagement on the friction region of the second synchronizer body. The transmission is thereby configured such that the sliding sleeve is bringable into a neutral position, in which the internal gearing of the sliding sleeve is not in engagement with the externally toothed regions of the synchronizer bodies, and is simultaneously in engagement with the external gearing of only one of the synchronizer rings. At the same time the sliding sleeve is configured such that, in another position, it is in engagement with the first and the second synchronizer rings simultaneously, but simultaneously not in engagement with the external gearings of the synchronizer bodies. The sliding sleeve, the synchronizer bodies, and the synchronizer rings form a locking device.

The synchronizer bodies are formed with a gear integrally or such that they rotate together; the gear has a further external gearing that is configured for meshing with gears (input- or output-shaft) on another shaft or attached thereto. By displacing the sliding sleeve (for example, using the above-described displacing device) between an engagement (a locking) with the one synchronizer body or the other synchronizer body, different gear ratios can be realized. In contrast to the first and second embodiment, in the synchronization position the gear wheels are braked or accelerated to the speed of the rotating sliding sleeve. One or more locking struts and the support of the synchronizer rings in the sliding sleeve is described as pertaining to the other embodiments.

A displacing device for displacing the sliding sleeve can be configured as in the above exemplary embodiments or in any other manner (hydraulically actuated, linear-motor actuated, etc.), in particular conventionally via shift forks.

Figure 14:
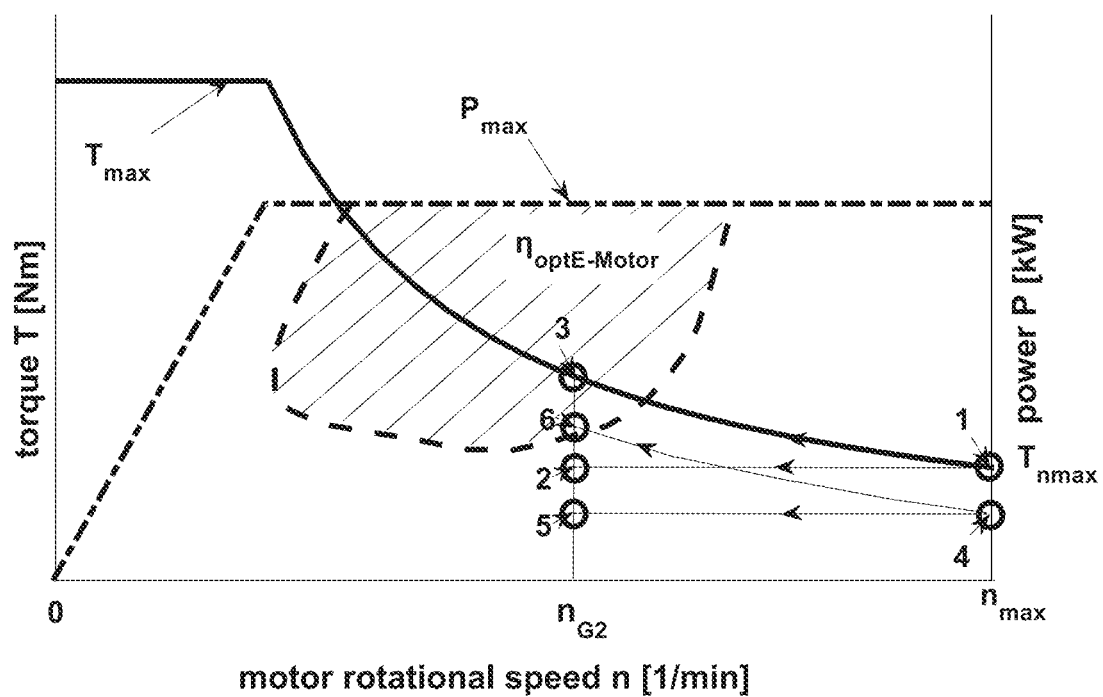
FIG. 14 shows various possible shifting processes in an idealized characteristic curve of an electric drive machine having exemplary switching processes for the shifting from a first gear into a second gear.

FIG. 14 shows various shifting processes in an idealized torque- and power-characteristic-curve of an electric drive machine (E-motor), as well as the optimal efficiency range $\eta_{optE\text{-}Motor}$ of an E-motor (dependent on the type of machine, synchronous or asynchronous machine). $T_{max}$ indicates the nominal torque (maximum torque). $T_{nmax}$ indicates the maximum rotational speed torque. $P_{max}$ indicates the maximum power. In the embodiment described here, the shifting from the first into the second gear engages at the maximum rotational speed $n_{max}$ of the electric drive machine EM. Due to the very high rotational speed range with constant power (constant power range)—in comparison to combustion engines—, on the one hand a large gear step can be accepted; on the other hand it is in principle unimportant when the shifting from the first gear into the second gear is initiated, as long as the end point after the shifting into the second gear still does not exceed the maximum power range of the machine in terms of rotational speed. For the design of the friction clutch (synchronous clutch), it is recommended to perform the synchronization (the braking of the second ring gear) with the lowest-possible torque. This is the case when the E-motor is accelerated up to the maximum rotational speed $n_{max}$, and only at this point (the lowest torque for the maximum power of the electric drive machine) is the shifting initiated (see point 1 in FIG. 14). The dimensioning of the friction clutch is effected normally according to torque. If the shifting is generally initiated only at the preferred rotational speed $n_{max}$ (as depicted), the size of the friction device is minimized and the construction is simplified. The shifting from the first gear into the second gear is then possible in two ways. If the synchronization is not regulated (if the sliding sleeve is thus moved toward the second ring gear with a constant force (by the actuator)), the torque is constant during the synchronization, and point 2 is reached. Here the dog clutch is engaged (the sliding sleeve is brought into engagement with the synchronizer body), and the torque can now be regulated by the electric drive machine in accordance with the customer demand. For this case, the synchronization torque (clutch torque) of the friction clutch is constant; in this case the actuator need not be regulated. Alternatively the clutch torque can be regulated during the shifting by the actuator such that the clutch torque corresponds to the maximum output torque of the electric drive machine for the respective rotational speed in a manner dependent on the rotational speed of the electric drive machine (curve between points 1 and 3 in FIG. 14). For this case, a constant power at the output is possible during the shifting. The same applies for a shifting in the partial-load range, which is depicted by the points 4 to 5 and 4 to 6. This is always the case when the maximum power is not demanded upon reaching the maximum rotational speed of the drive machine (this is much more often the case in normal operation). For the shifting in the partial-load range, the actuator is correspondingly controlled in a manner dependent on the power demand of the customer (the gas-pedal position), in order to reduce or to avoid a load interruption. The gear ratio of $n_{max}/n_{G2}$ corresponds to the step jump of the manual transmission. To regulate the clutch torque, an ordinary torque sensor, which is not depicted here and is not described in more detail, can be provided in the friction clutch. Alternatively the clutch torque can be controlled by empirical values, which are previously determined empirically.

Further aspects of the present disclosure:

As already indicated above, in addition to the specific application in a transmission for an electric drive system for a vehicle, the present teaching is also usable in all other shiftable transmissions having at least two speeds. The teaching is thus applicable to conventional synchronizer groups (synchronization clutch or lock-type synchronous clutches), in which a first rotating gear rotating with no rotational speed or a first rotational speed is accelerated or braked, prior to a shifting process, to a second rotational speed of a second gear (or also a shaft), and subsequently fixedly coupled to the second gear via a sliding sleeve.

In general terms the present disclosure also comprises:

Aspect 1: Shifting subassembly for a transmission, including
  a housing,
  a sliding sleeve supported in the housing to be movable along a movement axis, which sliding sleeve has an internal gearing whose central axis is provided coaxially with the movement axis,
  a first synchronizer body, which is disposed coaxially with the sliding sleeve, having an externally geared region that is bringable into engagement with the internal gearing of the sliding sleeve by moving the sliding sleeve along the movement axis, and having a friction region that is preferably formed radially inside, and axially toward one side toward the movement axis with respect to the externally geared region,
  a second synchronizer body, which is disposed coaxially with the sliding sleeve and on the side of the friction region of the first synchronizer body, having an externally geared region that is bringable into engagement with the internal gearing of the sliding sleeve by moving the sliding sleeve along the movement axis, and having a friction region that is preferably formed radially inside and axially displaced with respect to the externally geared region on the side of the first synchronizer body, a first synchronizer ring having an external gearing that is bringable into engagement with the internal gearing of the sliding sleeve by moving the sliding sleeve along the movement axis, and having a friction region that is configured for abutment against the friction region of the first synchronizer body, a second synchronizer ring having an external gearing that is bringable into engagement with the internal gearing of the sliding sleeve by moving the sliding sleeve along the movement axis, and having a friction region that is configured for abutment against the friction region of the second synchronizer body, wherein the shifting subassembly is configured such that the sliding sleeve is bringable into a neutral position, in which the internal gearing of the sliding sleeve is not in engagement with the externally geared regions of the synchronizer bodies, and is simultaneously in engagement with the external gearing of only one of the synchronizer rings.

Aspect 2: the shifting subassembly according to Aspect 1 is further configured such that, in a movement along the rotational axis, the sliding sleeve is bringable into a pre-synchronization position, in which the internal gearing of the sliding sleeve is not in engagement with the externally toothed regions of the two synchronizer bodies, simultaneously the internal gearing of the sliding sleeve is in engagement with the external gearing of only one of the synchronizer rings, and simultaneously the sliding sleeve brings a locking strut, which is provided such that it is not rotatable relative to the sliding sleeve, into axial abutment against the other of the synchronizer rings, and presses the other of the synchronizer rings against the corresponding synchronizer body, whereby the other synchronizer ring is relatively rotated with respect to the sliding sleeve into a lock position, in which the gearings of the sliding sleeve and of the other synchronizer ring are relatively rotated with respect to each other.

Aspect 3: the shifting subassembly according to Aspect 1 or 2 is further configured such that, in a movement along the rotational axis, the sliding sleeve is bringable into a synchronization position, in which the internal gearing of the sliding sleeve is not in engagement with the externally geared regions of the synchronizer bodies, and simultaneously the internal gearing of the sliding sleeve is at least partially in engagement with the external gearings of both synchronizer rings, and force is preferably exerted by the sliding sleeve onto one of the synchronizer rings in the direction of the rotational axis, so that the corresponding synchronizer body is bringable to the same rotational speed with the corresponding synchronizer ring (a torque acts on the synchronizer body) via the friction engagement.

Further Aspects:

4. Transmission for an electric drive system for a vehicle, including a housing (G), an input shaft (E) supported in the housing (G) to be rotatable about a rotational axis (X), an output shaft (A) supported in the housing (G) to be rotatable about the rotational axis (X), a first planetary transmission (10) and a second planetary transmission (12) that are disposed adjacent to each other coaxially with the rotational axis (X), and have different gear ratios with respect to each other, wherein the first planetary transmission (10) and the second planetary transmission (12) include a common planetary carrier (S) that is supported in the housing (G) to be rotatable about the rotational axis (X) and is connected to the output shaft (A), and the first planetary transmission (10) includes a first ring gear (14) supported in the housing (G) to be rotatable around the rotational axis (X), and the second planetary transmission (12) includes a second ring gear (16) supported in the housing (G) to be rotatable about the rotational axis (X), a locking device (2), using which the first ring gear (14) or the second ring gear (16) is selectively lockable to the housing (G) so that, when the first ring gear (14) is locked, a torque is transmissible from the input shaft (E) to the output shaft (A) via the first planetary transmission (10) at a first gear ratio, and when the second ring gear (16) is locked, a torque is transmissible from the input shaft (E) to the output shaft (A) via the second planetary transmission (12) at a second gear ratio, wherein the locking device (2) includes a sliding sleeve (18), which is disposed in the housing (G) such that the sliding sleeve (18) is not rotatable relative to the housing (G) and is axially movable along the rotational axis (X), and which has an internal gearing (20), a first synchronizer body (22) that is rigidly connected with the first ring gear (14) or is formed integrally therewith, and has an external gearing (24) that is configured such that it is bringable into engagement with the internal gearing (20) of the sliding sleeve (18) by moving the sliding sleeve (18) along the rotational axis (X) into a first position, and a second synchronizer body (26) that is rigidly connected with the second ring gear (16) or is formed integrally therewith, and has an external gearing (28) that is configured such that it is bringable into engagement with the internal gearing (20) of the sliding sleeve (18) by moving the sliding sleeve (18) along the rotational axis (X) into a second position, and a displacing device (46) having an actuator, using which the sliding sleeve (18) is displaceable along the rotational axis (X) between the first position and the second position.

5. Transmission according to Aspect 4., wherein the first synchronizer body (22) has a friction region (30) on the side facing the second synchronizer body (26), and the second synchronizer body (26) has a friction region (32) on the side facing the first synchronizer body (22), a first synchronizer ring (34) is provided, which has an external gearing (36) that is configured such that it is bringable into engagement with the internal gearing (20) of the sliding sleeve (18) by moving the sliding sleeve (18), using the actuator, along the rotational axis (X), and which has a friction region (38) that is configured for abutment against the friction region (30) of the first synchronizer body (22); and a second synchronizer ring (40) is provided, which has an external gearing (42) that is configured such that it is bringable into engagement with the internal gearing (20) of the sliding sleeve (18) by moving the sliding sleeve (18), using the actuator, along the rotational axis (X), and which has a friction region (44) that is configured for abutment against the friction region (32) of the second synchronizer body (26).

6. Transmission according to Aspect 5., wherein
the locking device (2) is further configured such that, using the actuator, the sliding sleeve (18) is bringable into a neutral position, in which the internal gearing (20) of the sliding sleeve (18) is not in engagement with the external gearings (24, 28) of the synchronizer bodies (22, 26), and is simultaneously in engagement with the external gearing (36, 42) of only one of the synchronizer rings (34, 40).

7 Transmission according to Aspect 5. or 6., wherein
the locking device (2) is configured such that, using the actuator, the sliding sleeve (18) is bringable, in a movement along the rotational axis (X), into a pre-synchronization position, in which the internal gearing (20) of the sliding sleeve (18) is not in engagement with the external gearings (24, 28) of the two synchronizer bodies (22, 26), simultaneously the internal gearing (20) of the sliding sleeve (18) is in engagement with the external gearing (36, 42) of only one of the synchronizer rings (34, 40), and simultaneously the sliding sleeve (18) brings a locking strut (39), which is provided such that it is not rotatable relative to the sliding sleeve (18), into axial abutment against the other of the synchronizer rings (34, 40), and presses the other of the synchronizer rings (34, 40) against the corresponding synchronizer body, whereby the other synchronizer ring is relatively rotated with respect to the sliding sleeve into a lock position, in which the gearings (20) of the sliding sleeve (18) and of the other synchronizer ring are relatively rotated with respect to each other.

8. Transmission according to one of Aspects 5. to 7., wherein
the locking device is configured such that, using the actuator, in a movement along the rotational axis (X), the sliding sleeve (18) is bringable into a synchronization position, in which the internal gearing (20) of the sliding sleeve (18) is not in engagement with the external gearings (24, 28) of the two synchronizer bodies (22, 26), and simultaneously the internal gearing (20) of the sliding sleeve (18) is at least partially in engagement with the external gearings (36, 42) of both synchronizer rings, and force is preferably exerted by the sliding sleeve (18) in the direction of rotation (X) onto one of the synchronizer rings (34, 40) such that the corresponding synchronizer body (22, 26) is brakeable by the friction engagement with the one synchronizer ring (34, 40).

9. Transmission according to one of Aspects 5. to 8., wherein
the locking device is configured such that the torque transmission via the first planetary transmission (10) is realized by bringing the sliding sleeve along the rotational axis (X) using the actuator into a first-gear position, in which the internal gearing (20) of the sliding sleeve (18) is in engagement with the external gearing (24) of the first synchronizer body (22), and is simultaneously not in engagement with the external gearings (28, 42) of the second synchronizer body (26) and of the second synchronizer ring (40), and such that the torque transmission via the second planetary transmission (12) is realized by bringing the sliding sleeve (18) along the rotational axis (X) using the actuator into a second-gear position, in which the internal gearing (20) of the sliding sleeve (18) is in engagement with the external gearing (28) of the second synchronizer body (26), and simultaneously is not in engagement with the external gearings (24, 36) of the first synchronizer body (22) and of the first synchronizer ring (34).

10. Transmission according to one of Aspects 5. to 9., wherein
the width of the internal gearing (20) of the sliding sleeve (18) in the direction of the rotational axis (X) is greater than the spacing of the external gearings (36, 42) of the synchronizer rings (34, 40) in the direction of the rotational axis (X) and is smaller than the distance of the external gearing (24, 28) of one of the synchronizer bodies (22, 26) to the external gearing of the respective other synchronizer ring (40, 34) in the direction of the rotational axis (X).

11. Transmission according to one of Aspects 4. to 10., wherein
the diameter of the internal gearing (20) of the sliding sleeve (18) is greater than the diameter of the internal gearing of the smaller ring gear (14, 16).

12. Transmission according to one of Aspects 4. to 11., wherein
the first planetary transmission (10) includes a first sun gear (1'), which is provided on the input shaft (E) such that they rotate together, and a first planetary gear (6'), which is rotatably supported on the planet carrier (S) and meshes with the first sun gear (1') and with the first ring gear (14), and
the second planetary transmission (12) includes a second sun gear (1), which is provided on the input shaft (E) such that they rotate together, and a second planetary gear (6), which is rotatably supported on the planet carrier (S) and meshes with the second sun gear (1) and with the second ring gear (16).

13. Transmission according to one of Aspects 4. to 12., wherein
the first planetary transmission (10) includes a first planetary gear (6'), which is rotatably supported on the planet carrier (S) and meshes with the first ring gear (14), and the second planetary transmission (12) includes a second planetary gear (6), which is rotatably supported on the planet carrier (S) and meshes with the second ring gear (16),
the first planetary gear (6') and the second planetary gear (6) are fixedly connected to each other,
the first or the second planetary gear (6', 6) meshes with a sun gear (1), which is provided on the input shaft (E) such that the sun gear (1) and the input shaft (E) rotate together, and
preferably the two planetary gears, which are fixedly connected to each other, are configured as step planetary gears, of which only one step meshes with the sun gear (1).

14. Transmission according to one of aspects 4. to 13., wherein
the displacing device (46) includes,
a worm shaft (50) that is drivable by the actuator (48), and
a worm gear (52) that is disposed coaxially with the sliding sleeve (18) and is disposed on the outer circumference side with respect thereto such that, as viewed starting from the rotational axis (X) in a radial direction perpendicular to the rotational axis (X), the sliding sleeve (18) at least partially overlaps the worm gear (52) and is rotatable by the worm shaft (50) around the rotational axis (X), and
a guide pin (56) that is provided on the sliding sleeve (18) and protrudes radially outward therefrom, wherein
a guide groove (54) for receiving the guide pin (56) is provided in the worm gear (52), the guide groove (54) extending at an angle (α) to the circumferential direction so that, during the rotation of the worm gear (52) by the angle (β), a displacement of the sliding sleeve (18) along a distance (x) occurs, and
the actuator is configured as an electric motor.

15. Transmission according to one of Aspects 4. to 14., wherein
the sliding sleeve (18) has an external gearing on its outer side, using which external gearing it is guidable along the rotational axis (X) in an internal gearing in the housing (G).

16. Transmission according to one of Aspects 4. to 15., wherein
the ring gears (14, 16) are supported radially on the planetary gears (6', 6), and bearings are respectively disposed for axial support between the ring gears and between their sides facing away from each other and the housing.

17. Transmission according to one of aspects 4. to 16., wherein
the input shaft (E) is supported in the planet carrier (S) via a bearing, or
the planet carrier (S) is supported on the input shaft (E).

18. Transmission, including
a housing (G), and
a locking device (2),
wherein
the locking device (2) includes
a sliding sleeve (18), which is supported in the housing to be movable along a movement axis, having an internal gearing (20) whose central axis is provided coaxially with the movement axis,
a first synchronizer body (22), which is disposed coaxially with the sliding sleeve (18), having an external gearing (24), which is bringable into engagement with the internal gearing (20) of the sliding sleeve (18) by moving the sliding sleeve (18) along the movement axis, and having a friction region (30), which is preferably formed radially inside, and axially toward one side toward the movement axis with respect to the external gearing (24) of the first synchronizer body (22),
a second synchronizer body (26), which is disposed coaxially with the sliding sleeve (18) and on the side of the friction region (30) of the first synchronizer body (22), having an external gearing (28), which is bringable into engagement with the internal gearing (20) by moving the sliding sleeve (18) along the movement axis, and having a friction region (32), which is preferably formed radially inside and axially displaced with respect to the external gearing (28) of the second synchronizer body (26) on the side of the first synchronizer body (22),
a first synchronizer ring (34) having an external gearing (36), which is bringable into engagement with the internal gearing (20) of the sliding sleeve (18) by moving the sliding sleeve (18) along the movement axis, and having a friction region (38), which is configured for abutment against the friction region (30) of the first synchronizer body (22), and
a second synchronizer ring (40) having an external gearing (42), which is bringable into engagement with the internal gearing (20) of the sliding sleeve (18) by moving the sliding sleeve (18) along the movement axis, and having a friction region (44), which is configured for abutment against the friction region (32) of the second synchronizer body (26),
wherein the locking device is configured such that
the sliding sleeve (18) is bringable into a neutral position, in which the internal gearing (20) of the sliding sleeve is not in engagement with the external gearing (24) of the first synchronizer body (22), and is not in engagement with the external gearing (28) of the second synchronizer body (26), and is simultaneously in engagement with the external gearing (36, 42) of only one of the synchronizer rings (34, 40).

19. Transmission according to Aspect 18., which is further configured such that
in a movement along the rotational axis (X), the sliding sleeve (18) is bringable into a pre-synchronization position, in which the internal gearing (20) of the sliding sleeve (18) is not in engagement with the external gearings (24, 28) of the two synchronizer bodies (22, 26), simultaneously the internal gearing (20) of the sliding sleeve (18) is in engagement with the external gearing (36, 42) of only one of the synchronizer rings (34, 40), and simultaneously the sliding sleeve (18) brings a locking strut (39), which is provided such that it is not rotatable relative to the sliding sleeve (18), into axial abutment against the other of the synchronizer rings (34, 40), and presses the other of the synchronizer rings (34, 40) against the corresponding synchronizer body, whereby the other synchronizer ring is relatively rotated with respect to the sliding sleeve (18) into a lock position, in which the gearings of the sliding sleeve (18) and of the other synchronizer ring are relatively rotated with respect to each other, and/or
in a movement along the rotational axis (X), the sliding sleeve (18) is bringable into a synchronization position, in which the internal gearing (20) of the sliding sleeve (18) is not in engagement with the external gearings (24, 28) of the two synchronizer bodies (22, 26), and simultaneously the internal gearing (20) of the sliding sleeve (18) is at least partially in engagement with the external gearings (36, 42) of both synchronizer rings, and preferably force is exerted by the sliding sleeve (18) onto one of the synchronizer rings (34, 40) in the direction of the rotational axis (X), so that the corresponding synchronizer body (22, 26) is synchronizable with the one synchronizer ring (34, 40) via the friction engagement.

20. Transmission according to Aspect 18. or 19., which is further developed with the characterizing features of at least one of Aspects 7., 8., and 12.

21. Transmission according to one of Aspects 18. to 20., which further includes
a displacing device (46) having an actuator, using which the sliding sleeve (18) is displaceable along the rotational axis (X).

22. Transmission according to one of Aspects 18. to 21., which further includes
an input shaft (E) supported in the housing (G) to be rotatable about a rotational axis (X),
an output shaft (A) supported in the housing (G) to be rotatable about the rotational axis (X),
a first planetary transmission (10) and a second planetary transmission (12), which are disposed adjacent to each other coaxially with the rotational axis (X), and have different gear ratios with respect to each other, wherein the first planetary transmission (10) and the second planetary transmission (12) include a common planetary carrier (S), which is supported in the housing (G) to be rotatable about the rotational axis (X) and is connected to the output shaft (A), and the first planetary transmission (10) includes a first ring gear (14), which is supported in the housing (G) to be rotatable around the rotational axis (X), and the second planetary transmission (12) includes a second ring gear (16), which is supported in the housing (G) to be rotatable about the rotational axis (X), wherein using the locking device (2), the first ring gear (14) or the second ring gear (16) is selectively lockable to the housing (G) so that, when the first ring gear (14) is locked, a torque is transmissible from the input shaft (E) to the output shaft (A) via the first planetary transmission (10) at a first gear ratio and, when the second ring gear (16) is locked, a torque is transmissible from the input shaft (E) to the output shaft (A) via the second planetary transmission (12) at a second gear ratio.

23. Transmission according to Aspect 22., as dependent on Aspect 21., which is further developed with the characterizing features of at least one of Aspects 9. and 12., 13., 14., 16., and 17.

It is self-evident that a transmission having such a shifting subassembly is also encompassed by the teaching.

The appended dependent claims are freely combinable with above Aspects, wherein the term "locking device" is to be equated with "shifting subassembly," and the term "external gearing of the synchronizer bodies" is to be equated with "externally geared regions of the synchronizer bodies."

It is explicitly emphasized that all of the features disclosed in the description and/or the claims should be considered as separate and independent from one another for the purpose of the original disclosure as well as for the purpose of limiting the claimed invention, independent of the combinations of features in the embodiments and/or the claims. It is explicitly stated that all range specifications or specifications of groups of units disclose every possible intermediate value or subgroup of units for the purpose of the original disclosure as well as for the purpose of limiting the claimed invention, in particular also as the limit of a range specification.

The Figures are to be regarded as purely schematic. Figures, which are to show different states and views of the same embodiment, can also represent details of the embodiment in different degrees of detail. The functional and structural description remains relevant.

The terms "roughly," "about," "approximately," "substantially," or "generally" used here, which are used in connection with a measurable value such as, for example, a parameter, a quantity, a shape, a time duration, or the like, include deviations or fluctuations of ±10% or less, preferably ±5% or less, further preferably ±1% or less, and further preferably ±0.1% of the respective value or from the respective value, provided these deviations are still technically useful in practice in the implementation of the disclosed invention. Ultimately the longitudinal or dimensional tolerances of the component determine the deviations or fluctuations of the parameters. It is expressly indicated that the value to which the term "approximately" refers is explicitly and specifically disclosed as such. The indication of ranges by initial and final values comprises all those values and fractions of those values that are enclosed by the respective range as well as its initial and final values.

REFERENCE NUMBER LIST

EM Electric drive machine (E-motor)
E Input shaft
A Output shaft
X Rotational axis
G Housing
S Bridge
α Angle of inclination of the groove in the worm gear
β Circumferential angle ("length") of the groove
1' First sun gear
1 Second sun gear
2 Locking device
6' First planetary gear
6 Second planetary gear
10 First planetary transmission
12 Second planetary transmission
14 First ring gear
16 Second ring gear
17 Stepped connecting component
18 Sliding sleeve
20 Internal gearing of the sliding sleeve
22 First synchronizer body
24 External gearing of the first synchronizer body
26 Second synchronizer body
28 External gearing of the second synchronizer body
30 Friction region of the first synchronizer body
32 Friction region of the second synchronizer body
34 First synchronizer ring
36 External gearing of the first synchronizer ring
38 Friction region of the first synchronizer ring
39 Locking strut
39a Spring
39b Abutment surface of the locking strut
39c Abutment surface of the sliding sleeve
40 Second synchronizer ring
42 External gearing of the second synchronizer ring
44 Friction region of the second synchronizer ring
46 Displacing device
48 Electric motor
50 Worm shaft
52 Worm gear
54 Guide groove in the worm gear
56 Guide pin in the sliding sleeve
58 First bearing for the stepped planets
60 Second bearing for the stepped planets
62 Axial bearing between the ring gears

The invention claimed is:

1. A transmission for an electric drive system for a vehicle, including:
a housing,
an input shaft supported in the housing to be rotatable about a rotational axis,
an output shaft supported in the housing to be rotatable about the rotational axis,
a first planetary transmission and a second planetary transmission disposed adjacent to each other coaxially with the rotational axis, and having different gear ratios with respect to each other, wherein the first planetary transmission and the second planetary transmission include a common planetary carrier supported in the housing to be rotatable about the rotational axis and connected to the output shaft, the first planetary transmission includes a first ring gear supported in the housing to be rotatable around the rotational axis, and the second planetary transmission includes a second ring gear supported in the housing to be rotatable about the rotational axis, a locking device configured to selectively lock the first ring gear or the second ring gear to the housing so that, when the first ring gear is locked to the housing, torque is transmissible from the input shaft to the output shaft via the first planetary transmission at a first gear ratio and, when the second ring gear is locked to the housing, torque is transmissible from the input shaft to the output shaft via the second planetary transmission at a second gear ratio, wherein:

the locking device includes:
- a sliding sleeve disposed in the housing to be non-rotatable relative to the housing while being axially movable along the rotational axis, the sliding sleeve having an internal gearing,
- a first synchronizer body rigidly connected to the first ring gear or formed integrally therewith, the first synchronizer body having an external gearing configured to be bringable into engagement with the internal gearing of the sliding sleeve by moving the sliding sleeve along the rotational axis into a first position,
- a second synchronizer body rigidly connected to the second ring gear or formed integrally therewith, the second synchronizer body having an external gearing configured to be bringable into engagement with the internal gearing of the sliding sleeve by moving the sliding sleeve along the rotational axis into a second position, and
- a displacing device having an actuator configured to displace the sliding sleeve along the rotational axis between the first position and the second position, the first synchronizer body has a first friction region on a side facing the second synchronizer body, and the second synchronizer body has a second friction region on a side facing the first synchronizer body, a first synchronizer ring has an external gearing configured to be bringable into engagement with the internal gearing of the sliding sleeve by actuating the actuator to move the sliding sleeve along the rotational axis, the first synchronizer ring has a third friction region configured to abut against the first friction region of the first synchronizer body, a second synchronizer ring has an external gearing configured to be bringable into engagement with the internal gearing of the sliding sleeve by actuating the actuator to move the sliding sleeve along the rotational axis, the second synchronizer ring has a fourth friction region configured to abut against the second friction region of the second synchronizer body, the locking device is configured to actuate the actuator to move the sliding sleeve along the rotational axis into a synchronization position, in which the internal gearing of the sliding sleeve is not in engagement with the external gearings of the first and second synchronizer bodies while simultaneously the internal gearing of the sliding sleeve is at least partially in engagement with the external gearings of both of the first and second synchronizer rings, and force is exerted by the sliding sleeve in the direction of the rotation axis onto one of the first or second synchronizer rings such that the corresponding first or second synchronizer body is brakeable by the friction engagement with said one of the first or second synchronizer rings, and the fourth friction region of the second synchronizer ring and the first friction region of the second synchronizer body are dimensioned such that both the fourth friction region of the second synchronizer ring and the first friction region of the second synchronizer body have a torque capacity sufficient to transmit torque to the output shaft in the synchronization position while the sliding sleeve moves from the first position into the second position.

2. The transmission according to claim 1, wherein the locking device is further configured to actuate the actuator to bring the sliding sleeve into a neutral position, in which the internal gearing of the sliding sleeve is not in engagement with the external gearings of the first and second synchronizer bodies, while being simultaneously in engagement with the external gearing of only one of the first or second synchronizer rings.

3. The transmission according to claim 2, wherein, in the synchronization position, the internal gearing of the sliding sleeve is partially in engagement with the external gearing of one of the first or second synchronizer rings such that tooth-heads and tooth-troughs of the internal gearing of the sliding sleeve and of the external gearing of said one of the first or second synchronizer ring are rotated by an angle relative to one another to apply an axial force to said one of the first or second synchronizer ring, and the tooth-heads and tooth-troughs of the internal gearing are simultaneously in engagement with the external gearing of the other one of the first or second synchronizer ring such that the tooth-heads and tooth-troughs of the internal gearing of the sliding sleeve and of the external gearing of said other one of the first or second synchronizer ring are not rotated relative to each other, so that no axial force is applied to said other one of the first or second synchronizer ring via this tooth engagement.

4. The transmission according to claim 1, wherein the locking device is configured to actuate the actuator to move the sliding sleeve along the rotational axis into a pre-synchronization position, in which the internal gearing of the sliding sleeve is not in engagement with the external gearings of the first or second synchronizer bodies while simultaneously the internal gearing of the sliding sleeve is in engagement with the external gearing of only one of the first or second synchronizer rings, and while simultaneously the sliding sleeve brings a locking strut, which is not rotatable relative to the sliding sleeve, into axial abutment against the other of the first or second synchronizer rings, and presses the other of the first or second synchronizer rings against the corresponding first or second synchronizer body, such that the other of the first or second synchronizer ring is rotated relative to the sliding sleeve into a lock position, in which the internal gearing of the sliding sleeve and the external gearing of the other first or second synchronizer ring are rotated relative to each other.

5. The transmission according to claim 1, wherein the internal gearing of the sliding sleeve has a width in the direction of the rotational axis that is greater than a distance between the external gearings of the first and second synchronizer rings in the direction of the rotational axis and that is smaller than a distance between the external gearing of one of the first or second synchronizer bodies and the external gearing of the respective other one of the first or second synchronizer ring in the direction of the rotational axis.

6. The transmission according to claim 1, wherein the internal gearing of the sliding sleeve has a diameter that is greater than the diameter of the internal gearing of a smaller one of the first or second ring gear.

7. The transmission according to claim 1, wherein:
the displacing device includes:
a worm shaft that is drivable by the actuator,
a worm gear disposed coaxially with the sliding sleeve and disposed on an outer circumference side of the sliding sleeve such that, as viewed starting from the rotational axis in a radial direction perpendicular to the rotational axis, the sliding sleeve at least partially overlaps the worm gear and is rotatable by the worm shaft about the rotational axis, and
a guide pin provided on the sliding sleeve and protruding radially outward therefrom,
wherein:
a guide groove that receives the guide pin is provided in the worm gear, the guide groove extending at an angle ($\alpha$) to a circumferential direction of the worm gear so that, in response to rotation of the worm gear by an angle ($\beta$), the sliding sleeve displaces a distance (x) along the rotational axis, and
the actuator is an electric motor.

8. The transmission according to claim 1, wherein:
the first and second ring gears are supported radially on the planetary gears,
a first bearing is disposed between the housing and a side of the first ring gear facing away from the second ring gear,
a second bearing is disposed between the housing and a side of the second ring gear facing away from the first ring gear, and
a third bearing provides axial support between the first and second ring gears.

9. The transmission according to claim 1, wherein, in the synchronization position, the internal gearing of the sliding sleeve is partially in engagement with the external gearing of one of the first or second synchronizer rings such that tooth-heads and tooth-troughs of the internal gearing of the sliding sleeve and of the external gearing of said one of the first or second synchronizer ring are rotated by an angle relative to one another to apply an axial force to said one of the first or second synchronizer ring, and the tooth-heads and tooth-troughs of the internal gearing are simultaneously in engagement with the external gearing of the other one of the first or second synchronizer ring such that the tooth-heads and tooth-troughs of the internal gearing of the sliding sleeve and of the external gearing of said other one of the first or second synchronizer ring are not rotated relative to each other, so that no axial force is applied to said other one of the first or second synchronizer ring via this tooth engagement.

10. An electric drive system for a vehicle, including:
an electric drive machine, and
the transmission according to claim 1,
wherein the electric drive system is configured such that, in a shifting process in which the sliding sleeve is moved from the first position into the second position, torque is transmissible between the fourth friction region and the second friction region in the synchronization position via the abutment of the fourth friction region of the second synchronizer ring against the second friction region of the second synchronizer body, said torque being greater than 30% of a maximum rotational speed torque of the electric drive machine that is maximally deliverable by the electric drive machine at maximum rotational speed.

11. The electric drive system according to claim 10, wherein the locking device is configured such that:
in the shifting process, in which the sliding sleeve is moved from the first position into the second position, said torque transmitted in the synchronization position via the fourth and second friction regions remains substantially constant, or
in the shifting process, in which the sliding sleeve is moved from the first position into the second position, said torque transmitted in the synchronization position via the fourth and second friction regions increases with decreases of the rotational speed of the electric drive machine such that power delivered at the output shaft during the synchronization remains constant, and/or the power delivered at the output shaft during the synchronization corresponds to the power that is output at the output shaft immediately before the moving of the sliding sleeve from the first position into the second position.

12. The electric drive system according to claim 10, wherein the locking device is configured such that the shifting process, in which the sliding sleeve is moved from the first position into the second position, is triggered at a shifting rotational speed that is set such that, at a substantially constant rotational speed of the output shaft during the shifting process, the rotational speed of the electric drive machine after the shifting process remains in a constant power range of the electronic drive machine.

13. The electric drive system according to claim 12, wherein the locking device is configured such that the shifting process, in which the sliding sleeve is moved from the first position into the second position, is triggered at the maximum rotational speed of the electric drive machine.

14. The electric drive system according to claim 10, wherein the locking device is configured such that:
said torque, which is transmitted in the synchronization position via the fourth and second friction regions, corresponds to the maximum rotational speed torque, and/or remains constant during the synchronization, so that power delivered at the output shaft immediately before the shifting process continuously drops only slowly with decreasing of the rotational speed of the electric drive machine during the shifting process, or
said torque, which is transmitted in the synchronization position via the fourth and second friction regions, is at least temporarily lower or higher than the maximum rotational speed torque, and/or decreases or increases during the synchronization, so that power delivered at the output shaft immediately before the shifting process remains constant during the synchronization, or changes only continuously.

15. An electric drive system according to claim 10, wherein the drive system is configured such that, while the sliding sleeve is moving from the first position into the second position, the torque that is available at the output shaft does not change direction, so that propulsion is continuously deliverable.

16. An electric drive system according to claim 10, wherein the drive system is configured such that, while the sliding sleeve is moving from the first position into the second position, the electric drive machine is electrically braked in the synchronization position in addition to the braking by the fourth and second friction regions.

17. An electric drive system according to claim 10, wherein the locking device is configured such that in the shifting process, in which the sliding sleeve is moved from the first position into the second position, torque of the second ring gear is supported in the synchronization position by the fourth and second friction regions and said torque is transmitted to the output shaft for reducing or preventing a load interruption.

18. A transmission, including
a housing, and
a locking device,
wherein:
the locking device includes:
  a sliding sleeve movably supported in the housing along a movement axis, and having an internal gearing, a central axis of the sliding sleeve being coaxial with the movement axis,
  a first synchronizer body disposed coaxially with the sliding sleeve, the first synchronizer body having an external gearing configured to be bringable into engagement with the internal gearing of the sliding sleeve by moving the sliding sleeve along the movement axis, and having a first friction region,
  a second synchronizer body disposed coaxially with the sliding sleeve, the second synchronizer body having an external gearing configured to be bringable into engagement with the internal gearing by moving the sliding sleeve along the movement axis, and having a second friction region,
  a first synchronizer ring having an external gearing configured to be bringable into engagement with the internal gearing of the sliding sleeve by moving the sliding sleeve along the movement axis, and having a third friction region configured to abut against the first friction region of the first synchronizer body, and
  a second synchronizer ring having an external gearing configured to be bringable into engagement with the internal gearing of the sliding sleeve by moving the sliding sleeve along the movement axis, and having a fourth friction region configured to abut against the second friction region of the second synchronizer body,
wherein the locking device is configured such that:
  the sliding sleeve is configured to be bringable into a neutral position, in which the internal gearing of the sliding sleeve is not in engagement with the external gearing of the first synchronizer body and is not in engagement with the external gearing of the second synchronizer body while simultaneously being in engagement with the external gearing of only one of the first or second synchronizer rings, and
  in a movement along the movement axis, the sliding sleeve is configured to be bringable into a synchronization position, in which the internal gearing of the sliding sleeve is not in engagement with the external gearings of the first or second synchronizer bodies and simultaneously the internal gearing of the sliding sleeve is partially in engagement with the external gearing of one of the first or second synchronizer rings such that tooth-heads and tooth-troughs of the internal gearing of the sliding sleeve and of the external gearing of said one of the first or second synchronizer ring are rotated by an angle relative to each other to apply an axial force to said one of the first or second synchronizer rings such that the corresponding synchronizer body is synchonizable with said one of the first or second synchronizer rings via frictional engagement, while also being in engagement with the external gearing of the other one of the first or second synchronizer rings such that the tooth-heads and tooth-troughs of the internal gearing of the sliding sleeve and of the external gearing of the other one of the first or second synchronizer rings are not rotated relative to each other, so that no axial force is applied to the other one of the first or second synchronizer rings via this tooth engagement.

19. The transmission according to claim 18, wherein the internal gearing of the sliding sleeve has a width that is between 1% and 10% smaller than a distance between the external gearing of said one of the first or second synchronizer bodies and the external gearing of the respective opposing synchronizer ring.

20. The transmission according to claim 18, wherein the internal gearing of the sliding sleeve has a width in the direction of the movement axis that is greater than a distance between the external gearings of the first and second synchronizer rings in the direction of the movement axis and that is smaller than a distance between the external gearing of one of the first or second synchronizer bodies and the external gearing of the respective other one of the first or second synchronizer ring in the direction of the movement axis.

* * * * *

UNITED STATES PATENT AND TRADEMARK OFFICE
CERTIFICATE OF CORRECTION

PATENT NO. : 11,892,063 B2
APPLICATION NO. : 17/768592
DATED : February 6, 2024
INVENTOR(S) : Bernd-Robert Höhn It is certified that error appears in the above-identified patent and that said Letters Patent is hereby corrected as shown below:

In the Drawings

Sheet 4/9, Fig. 7, reference number "39d" should be "39b".

In the Claims

In Claim 14, Column 34, Lines 43-44, delete "only slowly".

Signed and Sealed this
Thirtieth Day of April, 2024

Katherine Kelly Vidal
*Director of the United States Patent and Trademark Office*